US012590002B2

(12) United States Patent (10) Patent No.: US 12,590,002 B2
Seibers et al. (45) Date of Patent: Mar. 31, 2026

(54) CHEMICALLY FUNCTIONALIZED GRAPHENE OXIDE NANOPARTICLE COMPOSITES, COATINGS AND METHODS OF USE THEREOF

(71) Applicant: Georgia Tech Research Corporation, Atlanta, GA (US)

(72) Inventors: Zach Seibers, Atlanta, GA (US); Thomas Michael Orlando, Atlanta, GA (US); John R. Reynolds, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 267 days.

(21) Appl. No.: 18/248,547

(22) PCT Filed: Oct. 15, 2021

(86) PCT No.: PCT/US2021/055189
§ 371 (c)(1),
(2) Date: Apr. 11, 2023

(87) PCT Pub. No.: WO2022/093554
PCT Pub. Date: May 5, 2022

(65) Prior Publication Data
US 2023/0373792 A1 Nov. 23, 2023

Related U.S. Application Data

(60) Provisional application No. 63/092,730, filed on Oct. 16, 2020, provisional application No. 63/092,401, filed on Oct. 15, 2020.

(51) Int. Cl.
*C01B 32/194* (2017.01)
*C01B 32/198* (2017.01)
(Continued)

(52) U.S. Cl.
CPC .......... *C01B 32/194* (2017.08); *C01B 32/198* (2017.08); *C08J 3/201* (2013.01);
(Continued)

(58) Field of Classification Search
None
See application file for complete search history.

(56) References Cited

U.S. PATENT DOCUMENTS

2013/0005917 A1   1/2013  Zhamu et al.
2017/0151548 A1*  6/2017  Tour ......................... B03C 5/00
2017/0218166 A1   8/2017  Hanan

FOREIGN PATENT DOCUMENTS

KR    20160127237 A  * 11/2016  ......... C01B 31/0469
KR    20180058903 A    6/2018

OTHER PUBLICATIONS

Shen et al., "Covalent synthesis of organophilic cehmically functionalized graphene sheets", Journal of Colloid and INterace Science, 348, (2010), pp. 377-383.*
(Continued)

*Primary Examiner* — Khanh T Nguyen
(74) *Attorney, Agent, or Firm* — TROUTMAN PEPPER LOCKE LLP; Ryan A. Schneider; Korbin M. Blunck

(57) ABSTRACT
Polymeric nanoparticle composites and methods for making and using the same are provided. Nanoparticle coatings and methods for making and using the same are also provided. Further, methods for synthesizing alkylated reduced graphene oxide nanoparticles are provided.

20 Claims, 18 Drawing Sheets

(51) Int. Cl.

| | |
|---|---|
| *C08J 3/20* | (2006.01) |
| *C08J 5/18* | (2006.01) |
| *C08K 9/04* | (2006.01) |
| *C09D 1/00* | (2006.01) |
| *C09D 5/24* | (2006.01) |
| *C09D 7/20* | (2018.01) |

(52) U.S. Cl.

CPC .................. *C08J 5/18* (2013.01); *C08K 9/04* (2013.01); *C09D 1/00* (2013.01); *C09D 5/24* (2013.01); *C09D 7/20* (2018.01); *C01P 2002/82* (2013.01); *C01P 2002/85* (2013.01); *C01P 2002/86* (2013.01); *C01P 2002/88* (2013.01); *C01P 2004/03* (2013.01); *C01P 2004/20* (2013.01); *C01P 2004/61* (2013.01); *C01P 2006/40* (2013.01); *C08J 2323/06* (2013.01); *C08K 2201/001* (2013.01); *C08K 2201/003* (2013.01); *C08K 2201/011* (2013.01)

(56) References Cited

OTHER PUBLICATIONS

Mohan et al., "Graphene-based materials and their composites: A review on production, applications and product limitations", Composite Part B, 142, (2018), pp. 200-220.*

International Search Report and Written Opinion from Application No. PCT/US2021/55189 dated Jul. 11, 2022.

Seibers, "Chemically Functionalized Reduced Graphene Oxide as Additives in Polyethylene Composites for Space Applications," Polymer Engineering and Science (Oct. 18, 2019) 60(1) pp. 86-94.

International Preliminary Report on Patentability from Application No. PCT/US2021/055189 dated Apr. 27, 2023.

* cited by examiner

Peak Intensity rGO-dd28 – C1s
rGO-dd14 – C1s
rGO-dd03 – C1s
rGO – C1s
GO – C1s
Graphite – C1s rGO-dd28 – O1s
rGO-dd14 – O1s
rGO-dd03 – O1s
rGO – O1s
GO – O1s
Graphite – O1s rGO-dd28 – N1s
rGO-dd14 – N1s
rGO-dd03 – N1s
rGO – N1s
GO – N1s
Graphite – N1s 280 282 284 286 288 290 292 294    526 528 530 532 534 536 538 540    394 396 398 400 402 404 406

Binding Energy (eV)

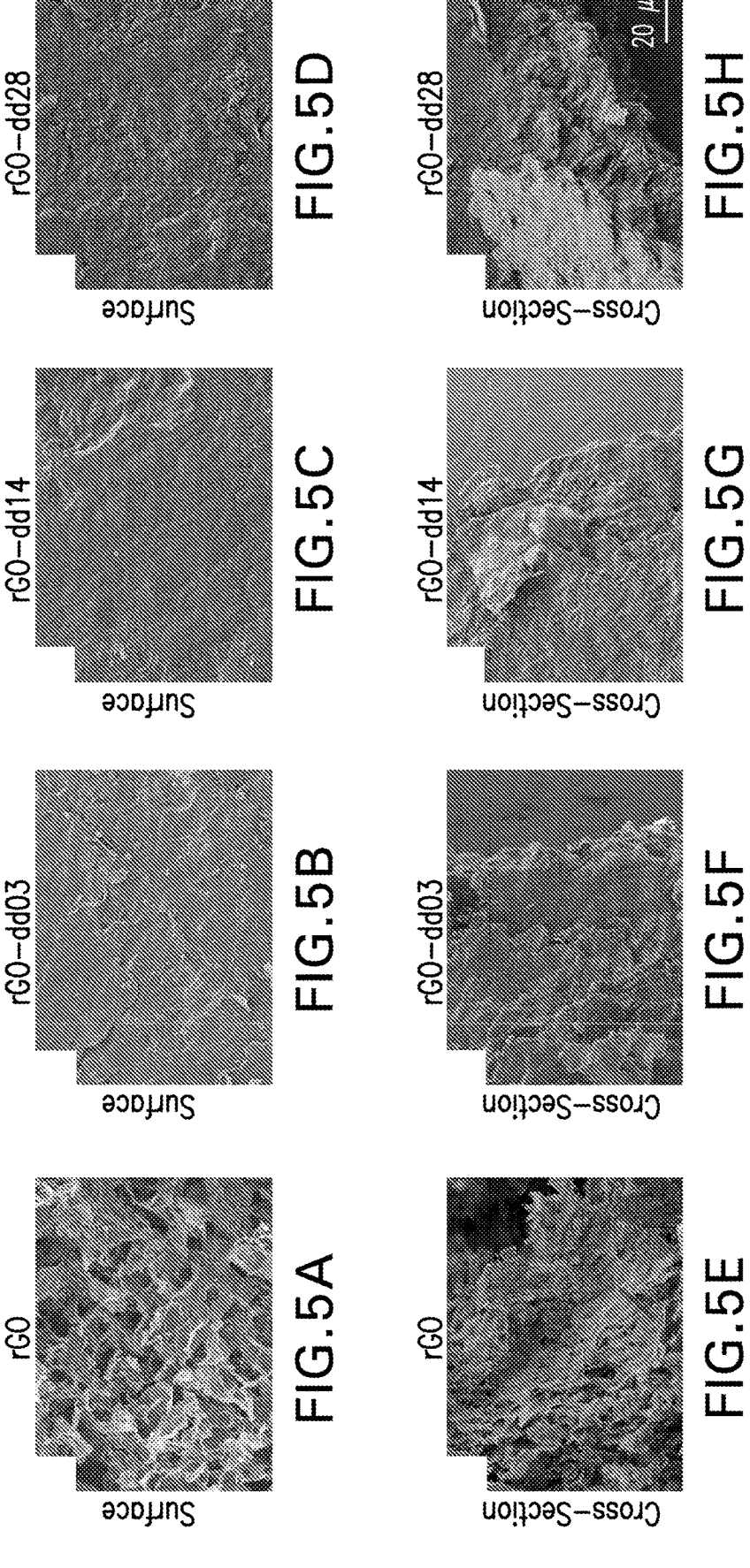

Box plots of tensile strengths
1=baseline HDPE
2=0.1% A-rGO
3=0.1% rGO
Axial tensile strength (MPa)
FIG.16A
Box plots of Poisson's ratios
1=baseline HDPE
2=0.1% A-rGO
3=0.1% rGO
Poisson's ratio
FIG.16B
Box plots of Young's moduli
1=baseline HDPE
2=0.1% A-rGO
3=0.1% rGO
Young's modulus (GPa)
FIG.16C
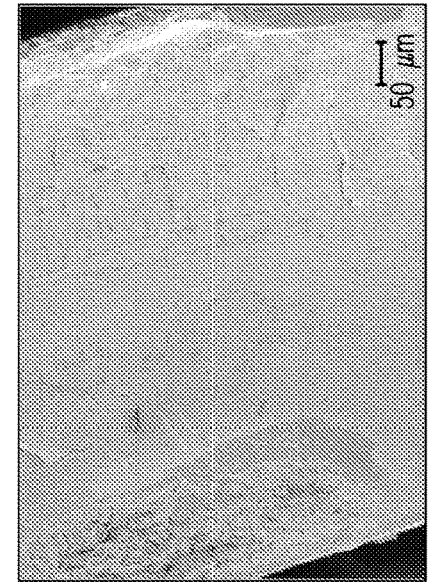
FIG.16E
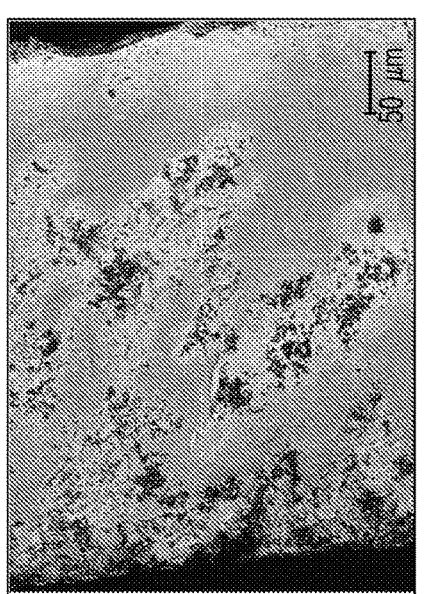
FIG.16D

Batch size ≈ 5.5g
Mix: 190°C and 200 rpm unmodified rGO after
melt pressing at 0.5%
by wt. in HDPE 13 cm HDPE    0.5 wt.% rGO    0.5 wt.% A-rGO 7.5 cm

CHEMICALLY FUNCTIONALIZED GRAPHENE OXIDE NANOPARTICLE COMPOSITES, COATINGS AND METHODS OF USE THEREOF

CROSS REFERENCE TO RELATED APPLICATIONS

This application claims priority to and benefit of U.S. Provisional Patent Application Nos. 63/092,401 filed on Oct. 15, 2020, and 63/092,730 filed on Oct. 16, 2020, which are incorporated by reference herein in their entirety.

STATEMENT REGARDING FEDERALLY SPONSORED RESEARCH

This invention was made with government support under NNA17BF68A awarded by the NASA Solar System Exploration Research Virtual Institute. The government has certain rights in the invention.

FIELD OF THE INVENTION

Embodiments described herein generally relate to polymeric nanoparticle composites, nanoparticle coatings, and methods for making and using the same. More particularly, such embodiments relate to chemically functionalized graphene oxide nanoparticle composites, and coatings.

BACKGROUND OF THE INVENTION

A major barrier to long-term space exploration is the development of technologies to protect astronauts and their equipment from harmful levels of radiation exposure (Durante, M. *Life Sci. Sp. Res.* 2014, 1, 2-9), which can lead to a variety of serious health effects such as cancer (Cucinotta, F. A.; Durante, M. *Lancet Oncol.* 2006, 7, 431-435). Materials rich in hydrogen are known to attenuate a variety of radiation types encountered during space travel, including High Z Element (HZE) ions found in galactic cosmic rays (GCRs), protons found in solar particle events (SPEs), and neutrons resulting from the collisions between GCRs and SPEs and matter (Thibeault, S. A.; Kang, J. H.; Sauti, G.; Park, C.; Fay, C. C.; King, G. C. *MRS Bull.* 2015, 40, 836-841). One of the most practical materials featuring rich H content is polyethylene, which has approximately 8.9× $10^{22}$ H atoms/cm$^3$, far more than water or even liquid H$_2$ (Kaul, R. K.; Barghouty, A. F.; Dahche, H. M. *Ann. N.Y. Acad. Sci.* 2004, 1027, 138-149). As such, polyethylene has been considered in space applications and even deployed on the International Space Station as passive shielding for crew sleeping quarters (Nambiar, S.; Yeow, J. T. W. *ACS Appl. Mater. Interfaces* 2012, 4, 5717-5726; Zhong, W. H.; Sui, G.; Jana, S.; Miller, J. *Compos. Sci. Technol.* 2009, 69, 2093-2097). Despite their favorable performance for radiation attenuation, polyethylene and many other olefins generally possess lower mechanical properties, such as tensile strength and impact toughness, than high-performance polymer systems such as Kevlar or poly(ether ether ketone). One slight advantage in using HDPE for protective applications is its remarkably low glass transition temperature of −166° C. that is far below the coldest lunar temperatures of −120° C.

An emerging approach to enhance mechanical and electrical properties of polymers during melt processing is to incorporate 2D graphene structures to form a nanocomposite (Chaudhry, A. U.; Mittal, V. *Polym. Eng. Sci.* 2013, 53, 78-88). The efficacy of this approach is perhaps most limited by the miscibility of the graphene structures with matrix polymers, a topic that has become the focus of many studies and reviews (Phiri, J.; Gane, P.; Maloney, T. C. *Mater. Sci. Eng. B* 2017, 215, 9-28; Sun, X.; Sun, H.; Li, H.; Peng, H. *Adv. Mater.* 2013, 25, 5153-5176; Du, J.; Cheng, H. M. *Macromol. Chem. Phys.* 2012, 213, 1060-1077; Gibson, R. F. *Compos. Struct.* 2010, 92, 2793-2810; Kim, H.; Abdala, A. A.; MacOsko, C. W. *Macromolecules* 2010, 43, 6515-6530). Typically, the conjugated sp$^2$ network of the graphene nanoparticle has little thermodynamic incentive to interact with the polymer matrix and instead prefers to aggregate. Ultimately, these aggregates create weak points that decrease the mechanical properties of the composite and can potentially create defects from which catastrophic fractures originate.

Many reports have emerged utilizing reduced graphene oxide (rGO) chemistry as a means for realizing well-dispersed graphene-like nanoparticles in polymer matrices (Dorigato, A.; Pegoretti, A. *Polym. Eng. Sci.* 2019, 59, 198-205; Punetha, V. D.; Rana, S.; Yoo, H. J.; Chaurasia, A.; McLeskey, J. T.; Ramasamy, M. S.; Sahoo, N. G.; Cho, J. W. *Prog. Polym. Sci.* 2017, 67, 1-47; Kuilla, T.; Bhadra, S.; Yao, D.; Kim, N. H.; Bose, S.; Lee, J. H. *Prog. Polym. Sci.* 2010, 35, 1350-1375). Before reduction, the various alcohol, carboxylic acid, and epoxide functional groups of GO confer solubility in solvents such as water and acetonitrile that provide numerous chemical modification and processing possibilities. These same functionalities disrupt the conjugated planarity of the GO and thus reduce the mechanical and electrical properties generally associated with graphene materials. After reduction of the GO, the resulting rGO loses solubility, however the material regains much of the lost electrical conductivity and strength generally associated with graphene (Konios, D.; Stylianakis, M. M.; Stratakis, E.; Kymakis, E. *J. Colloid Interface Sci.* 2014, 430, 108-112). As such, new chemical modifications and/or processing strategies are required to realize rGO-containing composites or films at the commercial scale.

Therefore, it is an object of the invention to provide chemically functionalized graphene oxide nanoparticle composites.

It is another object of the invention to provide chemically functionalized graphene oxide nanoparticle coatings.

It is still another object to provide methods for synthesizing alkylated reduced graphene oxide nanoparticles.

SUMMARY OF THE INVENTION

Polymeric nanoparticle composites and methods for making and using the same are provided. In one embodiment, polymeric nanoparticle composite can include a dispersion of polymer matrix and chemically functionalized graphene oxide nanoparticles.

In other embodiment, a method for preparing a polymeric nanoparticle composite can include melting the polymer via heating at 190° C., adding chemically functionalized graphene oxide nanoparticles to molten polymer to form a matrix, pressing the matrix flat, cooling the matrix to room temperature followed by cutting the matrix into small pieces, adding small pieces of matrix into an extruder, stirring and heating the matrix for 2 h at 180° C. using a screw speed of 100 rpm, removing the matrix from the extruder, placing the matrix into a Carver hot press, and pressing the matrix at 180° C. for 5 min to form films of polymeric nanoparticle composite.

Nanoparticle coatings and methods for making and using the same are provided. In one embodiment, a nanoparticle coating, can include a plurality of substrates, and chemically functionalized graphene oxide nanoparticle dispersion in a solvent, wherein the dispersion is deposited onto a substrate.

In other embodiment, a method for preparing a nanoparticle coating can include adding chemically functionalized graphene oxide nanoparticles and a solvent in a vial, stirring chemically functionalized graphene oxide nanoparticles and the solvent to form a uniform dispersion, depositing the dispersion onto a substrate, and allowing it to dry to room temperature to form the nanoparticle coating.

Methods for synthesizing an alkylated reduced graphene oxide nanoparticles are provided. In one embodiment, a method for synthesizing an alkylated reduced graphene oxide nanoparticle can include reacting graphite flakes with potassium permanganate and sulfuric acid at 80° C. to form a graphene oxide (GO), reducing the graphene oxide (GO) with hydrazine hydrate to form a reduced graphene oxide (rGO), and reacting the reduced graphene oxide (rGO) with a base in N-methyl-2-pyrrolidone (NMP) and an alkyl halide at 60° C. to form an alkylated reduced graphene oxide (A-rGO) nanoparticle.

In another embodiment, a method for synthesizing an alkylated reduced graphene oxide nanoparticle can include reacting graphite flakes with potassium permanganate and sulfuric acid at 80° C. to form a graphene oxide (GO), reacting the graphene oxide (GO) with a base in N-methyl-2-pyrrolidone (NMP) and an alkyl halide at 60° C. to form an alkylated graphene oxide (A-GO), and reducing the alkylated graphene oxide (A-GO) with hydrazine hydrate to form an alkylated reduced graphene oxide (A-rGO) nanoparticle.

BRIEF DESCRIPTION OF THE DRAWINGS

FIG. 5 shows scanning electron micrographs (SEMs) of rGO and rGO-dd pressed films. Images A-D depict the surface as viewed from above and images E-H observe the cross sections after liquid nitrogen fracturing.

FIG. 16 shows Box plots for (a) tensile strength, (b) Poisson's ratio, and (c) Young's Moduli of neat HDPE (group 1), 0.1% A-rGO (group 2), and 0.1% rGO (group 3). Cross sectional scanning electron micrographs for the (d) rGO-HDPE composite exhibits large voids and increased roughness indicative of rGO aggregation compared to the (e) A-rGO HDPE composite that lacks any voids and is much smoother.

DETAILED DESCRIPTION OF THE INVENTION

I. Definitions

Figure 1:
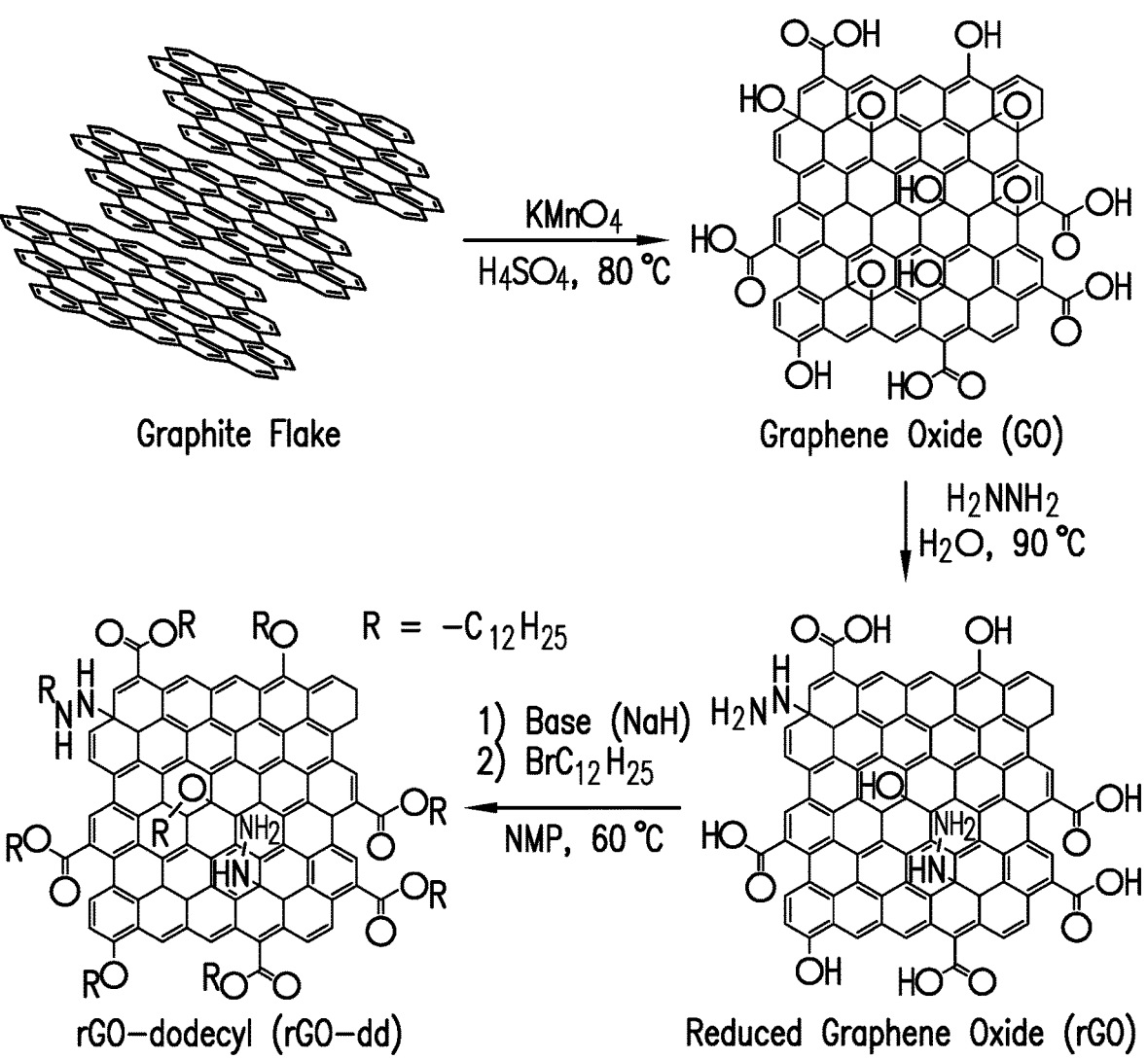
FIG. 1 shows the synthesis of reduced graphene oxide-dodecyl (rGO-dd).

The following terms are intended to have the meanings presented therewith below and are useful in understanding the description and intended scope of the present invention.

The articles "a" and "an" may be used herein to refer to one or to more than one (i.e., at least one) of the grammatical objects of the article. By way of example "an analogue" means one analogue or more than one analogue.

The term "about" as used herein, refers that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments. Additionally, in phrase "about X to Y," is the same as "about X to about Y," that is the term "about" modifies both "X" and "Y."

The term "compound" as used herein, refers to salts, solvates, complexes, isomers, stereoisomers, diastereoisomers, tautomers, and isotopes of the compound or any combination thereof.

The term "comprising" (and any form of comprising, such as "comprise", "comprises", and "comprised"), "having" (and any form of having, such as "have" and "has"), "including" (and any form of including, such as "includes" and "include"), or "containing" (and any form of containing, such as "contains" and "contain"), are used in their inclusive, open-ended, and non-limiting sense.

The term "effective," as that term is used in the specification and/or claims, means adequate to accomplish a desired, expected, or intended result.

As used herein, the term "coating" refers to a coating in a form that is suitable for application to a substrate as well as the material after it is applied to the substrate, while it is being applied to the substrate, and both before and after any post-application treatments (such as evaporation, cross-linking, curing, and the like). The components of the coating compositions may vary during these stages.

The coatings comprise chemically functionalized graphene nanoparticles and polymer binders and may optionally comprise additional components, such as at least one carrier like filler, pigment, catalyst, or accelerator other than a binder.

Some non-limiting examples of types of binders include polymeric binders. Polymeric binders (resins) can be thermoplastics or thermosets or modified natural alkyl resins and may be elastomers or fluoropolymers. Binders may also comprise monomers that can be polymerized before, during, or after the application of the coating to the substrate. Polymeric binders may be cross-linked or otherwise cured after the coating has been applied to the substrate Examples of polymeric binders include polyethers such as poly(ethylene oxide)s (also known as poly(ethylene glycol)s, poly (propylene oxide)s (also known as poly(propylene glycol)s, and ethylene oxide/propylene oxide copolymers, cellulosic resins (such as ethyl cellulose, ethyl hydroxyethyl cellulose, carboxymethyl cellulose, cellulose acetate, cellulose acetate propionates, and cellulose acetate butyrates), and polyvinyl butyral, polyvinyl alcohol and its derivatives, ethylene/vinyl acetate polymers, acrylic polymers and copolymers, styrene/acrylic copolymers, styrene/maleic anhydride copolymers, isobutylene/maleic anhydride copolymers, vinyl acetate/ethylene copolymers, ethylene/acrylic acid copolymers, polyolefins, polystyrenes, olefin and styrene copolymers, urethane resins, isocyanate resins, epoxy resins, acrylic latex polymers, polyester acrylate oligomers and polymers, polyester diol diacrylate polymers, UV-curable resins, and polyamide, including polyamide polymers and copolymers.

One method of obtaining graphene is from graphite and/or graphite oxide (also known as graphitic acid or graphene oxide). Graphite may be treated with oxidizing and intercalating agents and exfoliated. Graphite may also be treated with intercalating agents and electrochemically oxidized and exfoliated.

Reduction of graphite oxide to graphene may be by means of chemical reduction using hydrogen gas or other reducing agents. Examples of useful chemical reducing agents include, but are not limited to, hydrazines (such as hydrazine, N1N-dimethylhydrazine, etc.), sodium borohydride, hydroquinone, and the like. For example, a dispersion of exfoliated graphite oxide in a carrier (such as water, organic solvents, or a mixture of solvents) can be made using any suitable method (such as ultrasonication and/or mechanical grinding or milling) and reduced to graphene.

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, and the like. Some potential oxidants include $KCIO_4$; $HNO_3$ and $KCIO_3$; $KMnO_4$ and/or $NaMnO_4$; $KMnO_4$ and $NaNO_3$; $K_2S_2O_8$ and $P_2O_5$ and $KMnO_4$; $KMnO_4$ and $HNO_3$; and $HNO_3$. One intercalation agent includes sulfuric acid. Graphite may also be treated with intercalating agents and electrochemically oxidized. Graphite may also be treated with intercalating agents and electrochemically oxidized to be exfoliated to individual graphene oxide (GO) sheet or sheets by using sonication or other methods. The GO products, reduces or as prepared are commercially available. Furthermore, graphene oxide can be further functionalized with an amine, a hydroxyl, or carboxylic acid as described in the literature.

The coatings may optionally contain electrically conductive components other than the functionalized graphene such as metals (including metal alloys), conductive metal oxides, polymers, carbonaceous materials other than the high surface area functionalized graphene sheets, and metal-coated materials. These components can take a variety of forms, including particles, powders, flakes, foils, needles, etc.

The coatings may optionally contain fillers or pigments other than the functionalized graphene such as silica, fumed silica, alumina, calcium carbonate, zeolite and clays or TiO2 and other color pigments known in the art. The coatings may also optionally contain catalysts or accelerator including hardener other than the functionalized graphene to promote a fast curing of coatings as well as better cross-linking of thermoset coatings.

Examples of metals used in the compositions include, but are not limited to silver, copper, aluminum, platinum, palladium, nickel, chromium, gold, bronze, and the like. Examples of metal oxides include titanium oxide, antimony tin oxide and indium tin oxide and color pigments, and materials such as fillers coated with metal oxides. Metal and metal-oxide coated materials include, but are not limited to metal coated carbon and graphite fibers, metal coated glass fibers, metal coated glass beads, metal coated ceramic materials (such as beads), and the like. These materials can be coated with a variety of metals, including nickel.

Examples of electrically conductive polymers include, but are not limited to, polyacetylene, polyethylene dioxythiophene, polyaniline, polypyrroles, and the like.

The coatings may optionally comprise one or more carriers in which some or all of the components are dissolved, suspended, or otherwise dispersed or carried. Examples of suitable carriers include, but are not limited to, water, distilled or hydrocarbons.

The coatings may optionally comprise one or more additional additives, such as dispersion aids (including surfactants, emulsifiers, and wetting aids), adhesion promoters, thickening agents (including clays), defoamers and antifoamers, biocides, additional fillers, flow enhancers, stabilizers, cross-linking and curing agents, and the like. In one embodiment of the present disclosure, the surfactant is at least one ethylene oxide/propylene oxide copolymer.

The (graphene or) chemically functionalized graphene is present in the coating. However, as will be appreciated by those skilled in the art, the amount of chemically functionalized graphene present in the coatings can be selected based on the desired properties and the particular binders/polymers and other optional components chosen.

In one embodiment of the present disclosure, the coatings are electrically conductive. The coatings may be made using any suitable method, including wet or dry methods and batch, semi-continuous, and continuous methods. The resulting blends may be further processed by grinding using wet or dry grinding technologies or sonication. The technologies can be continuous or discontinuous. Examples include ball mills, attrition equipment, sandmills, and horizontal and vertical wet grinding mills, bath sonication or probe sonication. Suitable materials for use as grinding media include metals, carbon steel, stainless steel, ceramics, stabilized ceramic media (such as yttrium stabilized zirconium oxide), PTFE, glass, tungsten carbide, and the like. After blending and/or grinding steps, additional components may be added to the coatings, including, but not limited to, thickeners, viscosity modifiers, and the like. The coatings may also be diluted by the addition of more carrier.

After they have been applied to a substrate, the coatings may be cured using any suitable technique, including drying and oven-drying (in air or another inert or reactive atmosphere), UV curing, IR curing, microwave curing or drying, and the like. The coatings may be applied to a wide variety of substrates, including, but not limited to, metals; polymeric materials; fabrics (including cloths) and textiles; glasses and other minerals; ceramics, silicon surfaces; wood, pulp-based materials such as paper, and cardboard; silicon and other semiconductors; laminates; concrete, bricks, and other building materials; and the like. The substrates may have been treated with other coatings or similar materials before the coatings of the present disclosure are applied.

The coatings may be in a variety of forms, including, but not limited to, suspensions, solutions, pastes, and materials in substantially solid form like powders containing little or no liquids. They may be free-flowing, viscous, solid, powdery, and the like.

When applied to a substrate, the coatings can have a variety of thicknesses. The coatings can be applied to the same substrate in varying thicknesses at different points and can be used to build up three-dimensional structures on the substrate.

Some of the purposes and benefits of the coatings is corrosion resistance, water resistance, fouling resistance and UV durable coating. Applications for the coating include but not limited to, space, military, equipment, auto, ship, architectural building, bridges, civil, marine structures, filtration membranes or biological scaffolds.

The coatings can also be used for the passivation of surfaces, such as metal (e.g. steel, aluminum, etc.) surfaces, including exterior structures such as bridges and buildings. Examples of other uses of the coatings of the disclosure include: UV radiation resistant coatings, abrasion resistant (lubricant) coatings, coatings having permeation resistance to liquids (such as hydrocarbon, alcohols, water, and the like) and ions and/or gases, electrically conductive coatings, static dissipative coatings, and impact resistant coatings. They can be used to make fabrics having electrical conductivity. The coatings can be used in solar cell applications; signage, flat panel displays; flexible displays, including light-emitting diode, organic light-emitting diode, and polymer light-emitting diode displays; backplanes and front planes for displays, and lighting, including electroluminescent and OLED lighting.

The term "nanoparticle" as used herein, refers to particles that generally can be measured on a nanometer scale and, for example, may be about 1 nm to about 999 nm in diameter. In some embodiments nanoparticles include particles that include a diameter of less than about 500 nm. In this regard, as used herein the diameter of the nanoparticles can refer to the hydrodynamic diameter of the nanoparticles. Accordingly, nanoparticle is a term that can be used to describe the characteristics, and particularly the size, of a particle. Nanoparticle is also inclusive of micelles that can be measured on a nanoscale, including polymeric micelles that includes polymers having a hydrophobic end and a hydrophilic end, and wherein the hydrophobic ends of the polymers form a core of the nanoparticle and the hydrophilic ends of the polymers form an outer shell (i.e., corona) of the nanoparticle.

As used herein, the term "thermoplastic polymer" refers to a polymer that turns to a liquid or becomes more liquid or less viscous when heated and that can take on new shapes by the application of heat and pressure.

As used herein, the term "thermosetting polymer" refers to a prepolymer in a soft, solid or viscous state that changes irreversibly into an infusible, insoluble polymer network by curing.

As used herein, the term "polymer composite" refers to a multicomponent material comprising multiple different phase domains in which at least one type of phase domain is a continuous phase and in which at least one component is a polymer.

The thermoplastic polymer matrix resin may comprise any of a multitude of thermoplastic polymers including those commonly used in the composites art. For example, thermoplastic polymers may include, but are not limited to: thermoplastic polyketones, including polyetherketones, such as PEEK and PEKK; polyethylene, polypropylene; polyimides, such as the ULTEM family of products available from G.E. Plastics, and the family of products available from IMITEC based on a license from NASA Langley Research Center; polyarylene ethers; polysulfones; polyamides, such as nylon; polyesters; polystyrene; acrylonitrile butadiene styrene (ABS), acrylic; celluloid; cellulose acetate; ethylene vinyl acetate (EVA); ethylene vinyl alcohol (EVAL); fluoroplastics, such as PTFE, FEP, PEA, CTFE, ECTFE, and ETFE; ionomers; liquid crystal polymers (LCP); polyacetal (POM or acrylonitrile), polyamide-imide (PAI); polyaryletherketone (PAEK); polybutadiene (PBD); polybutylenes; polybutylene terephthalate (PBT); polyethylene terephthalate (PET); polycyclohexylene dimethylene terephthalate (PCT); polycarbonate, polyhydroxyalkanoates (PHAs); polyester polyetherimide (PEI); polysulfones, including polyethersulfone; polyethylenechlorinates, polylactic acid; polymethylpentene, polyphenylene oxide; polyphenylene sulfide; polyphthalamide; polyvinyl chloride; polyvinylidene chloride; and mixtures thereof may be utilized in embodiments. Additional thermoplastic polymers which may be used include those which are suitable for carrying mechanical loads, resisting degradation at elevated temperatures, and/or resisting dissolution in solvents. The particular selection of a thermoplastic polymer depends on the desired end use for the composite, and is well within the ordinary skill of those in the art.

Thermoplastics are designed to melt, flow, and consolidate and are typically non-reactive. Thus, thermoplastics generally do not undergo a chemical reaction during processing and do not require additives such as curing agents, accelerators and hardeners. However, in some embodiments, one or more additives may be utilized to tailor the properties of the thermoplastic to the processing parameters. For example, in some embodiments, a flow modifier may be added to the thermoplastic polymer to adjust the melt viscosity of the polymer. The particular selection of a flow modifier may depend on the thermoplastic polymer being used and the method of processing, and is well within the ordinary skill of those in the art.

II. Nanoparticle Coatings

Nanoparticle coatings and methods for making and using the same are provided. In one embodiment, a nanoparticle coating, can include a plurality of substrates, and chemically functionalized graphene oxide nanoparticle dispersion in a solvent, wherein the dispersion is deposited onto a substrate.

In some embodiment, the substrate is selected from the group consisting of glass, ceramic, metal, polymer, organic material, or combinations thereof.

In other embodiments, the deposition of nanoparticles onto the substrate is carried out by drop-cast, spray-cast, spin coating, dip coating, flow coating, knife coating, curtain coating, slot coating, brushing, dipping, spreading, spraying, wiping, or combinations thereof.

In further embodiments, the solvent is selected from the group consisting of water, an alcohol, a glycol, an ester, an ether, a ketone, an amide, a hydrocarbon, an aromatic solvent, a halogenated solvent, or combinations thereof.

In another embodiment, the solvent is toluene, chloroform, N-methyl-2-pyrrolidone (NMP), acetone, acetonitrile, N,N-dimethylformamide (DMF), water, or combinations thereof.

In some embodiments, the chemically functionalized graphene oxide nanoparticles comprise reduced graphene oxide nanoparticles, alkylated graphene oxide nanoparticles, alkylated reduced graphene oxide nanoparticles, or combinations thereof.

In other embodiment, a method for preparing a nanoparticle coating can include adding chemically functionalized graphene oxide nanoparticles and a solvent in a vial, stirring chemically functionalized graphene oxide nanoparticles and the solvent to form a uniform dispersion, depositing the dispersion onto a substrate, and allowing it to dry to room temperature to form the nanoparticle coating.

Methods for synthesizing an alkylated reduced graphene oxide nanoparticles are provided.

In one embodiment, a method for synthesizing an alkylated reduced graphene oxide nanoparticle can include reacting graphite flakes with potassium permanganate and sulfuric acid at 80° C. to form a graphene oxide (GO), reducing the graphene oxide (GO) with hydrazine hydrate to form a reduced graphene oxide (rGO), and reacting the reduced graphene oxide (rGO) with a base in N-methyl-2-pyrrolidone (NMP) and an alkyl halide at 60° C. to form an alkylated reduced graphene oxide (A-rGO) nanoparticle.

In another embodiment, the base is sodium hydride and the alkyl halide is dodecyl bromide.

A. Synthesis

Reaction scheme for the synthesis of reduced graphene oxide-dodecyl (rGO-dd) is given in FIG. 1 and described in Example 1. The synthesis of GO was performed using the modified Hummer's method that is well known for providing GO with a high content of oxygen functionalities including epoxide, alcohol, and carboxylic acid groups (Marcano, D. C.; Kosynkin, D. V.; Berlin, J. M.; Sinitskii, A.; Sun, Z.; Slesarev, A.; Alemany, L. B.; Lu, W.; Tour, J. M. *ACS Nano* 2010, 4, 4806-4814). The GO was reduced using hydrazine at reflux for two days to maximize the electrical conductivity of the rGO as it removes epoxy groups on the basal plane while restoring the $sp^2$ carbon network (Gao, X.; Jang, J.; Nagase, S. *J. Phys. Chem. C* 2010, 114, 832-842; Chua, C. K.; Pumera, M. *Chem. Soc. Rev.* 2014, 43, 291-312). Another important aspect of the hydrazine reduction process is the remaining functionalities around the perimeter of the rGO flakes (Gao, X.; Jang, J.; Nagase, S. *J. Phys. Chem. C* 2010, 114, 832-842). While these functional groups negatively impact the resulting electrical conductivity compared to a more complete reduction process such as thermal annealing, they provide additional anchor points to which functional groups can be grafted to modify the properties of the rGO. Other reduction agents have been reported that would avoid the hydrazine-based functional groups including HI (Chua, C. K.; Pumera, M. *Chem. Soc. Rev.* 2014, 43, 291-312; Moon, I. K.; Lee, J.; Ruoff, R. S.; Lee, H. *Nat. Commun.* 2010, 1, 1-6) and NaBH₄ (Chua, C. K.; Pumera, M. *Chem. Soc. Rev.* 2014, 43, 291-312; Yang, Z. Z.; Zheng, Q. B.; Qiu, H. X.; Li, J.; Yang, J. H. *New Carbon Mater.* 2015, 30, 41-47); however, these routes generally result in lower electronic conductivity (Chua, C. K.; Pumera, M. *Chem. Soc. Rev.* 2014, 43, 291-312).

Reactions of alkoxides with graphene substrates provides a robust pathway to install numerous dodecyl moieties to the remaining alcohol and carboxylic acid groups of the rGO by forming ether and ester linkages, as depicted in FIG. 1. N-Methyl-2-Pyrrolidone (NMP) was selected as the solvent as it is one of the best reported solvents for rGO, with stable solids loading of rGO in NMP of 9 μg/mL (Konios, D.; Stylianakis, M. M.; Stratakis, E.; Kymakis, E. *J. Colloid Interface Sci.* 2014, 430, 108-112). Upon reacting for 3 days at 60° C., a change in the apparent dispersion behavior was observed with fewer signs of aggregation in the reaction vessel upon completion. Given the apparently slow reaction rate, multiple reactions were performed with different reaction times spanning 3, 14 and 28 days. Aside from the chemical characterization discussed below, there are significant differences in the dispersion when the reaction is complete. In the longer reactions, 14 days and especially 28 days, the product is completely dispersed compared to the 3-day reaction condition. While the longer reaction times lead to products that disperse more readily, none of the products pass through 1 μm filters, which simplifies product recovery and purification. Each of these materials will be reported as rGO-ddXX, where XX denotes the number of days the reaction was performed.

B. Characterization i) Thermogravimetric Analysis (TGA)

Figure 2:
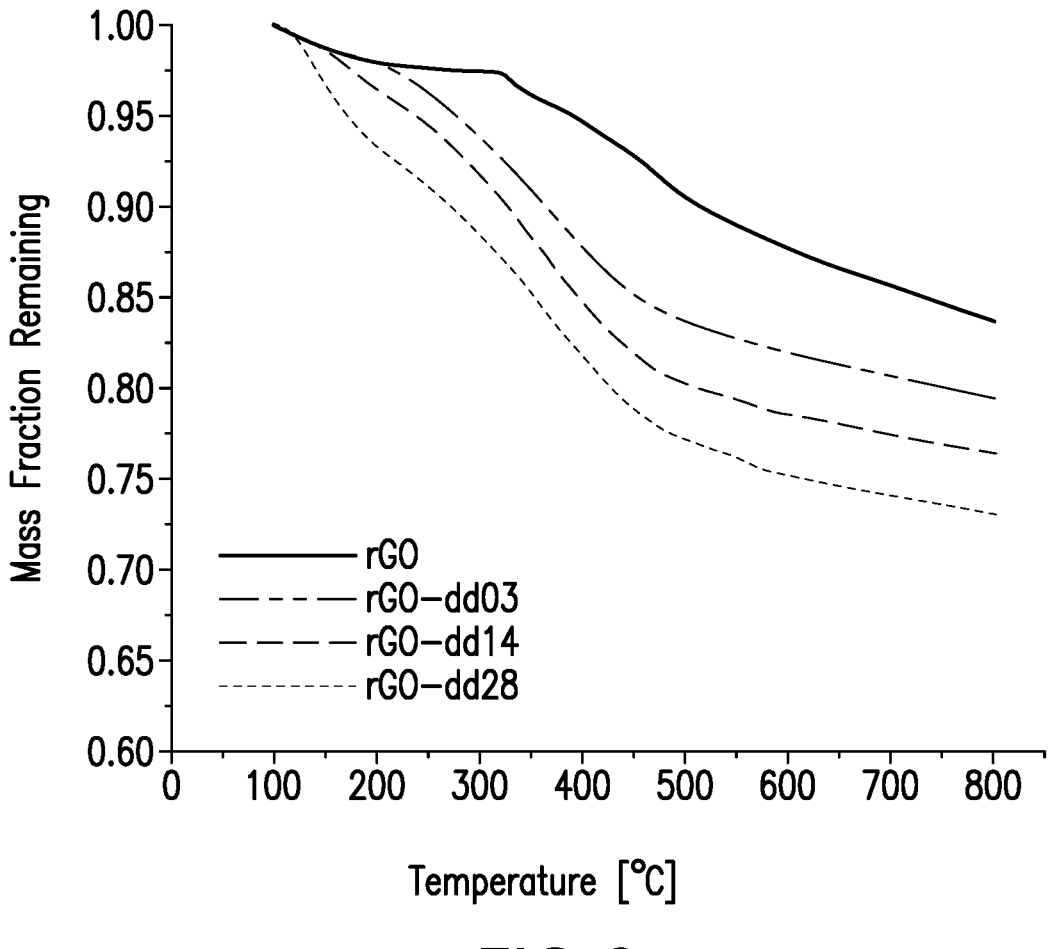
FIG. 2 shows thermogravimetric analysis (TGA) degradation profiles of normal rGO, dodecyl-functionalized rGO after 3 (red), 14 (blue), and 28 (pink) days.

TGA measurements were performed to assess the impact of reaction time on the amount of dodecyl chains grafted to the rGO nanoparticles. The thermogram for rGO, as shown in FIG. 2, resembles other reported TGA scans (Marcano, D. C.; Kosynkin, D. V.; Berlin, J. M.; Sinitskii, A.; Sun, Z.; Slesarev, A.; Alemany, L. B.; Lu, W.; Tour, J. M. *ACS Nano* 2010, 4, 4806-4814) that share rounded features and somewhat non-discrete degradation temperatures that have been attributed to a range of molecular structures (i.e., ether linkages with different neighboring C bonds) or heat transfer through the sample (Marcano, D. C.; Kosynkin, D. V.; Berlin, J. M.; Sinitskii, A.; Sun, Z.; Slesarev, A.; Alemany, L. B.; Lu, W.; Tour, J. M. *ACS Nano* 2010, 4, 4806-4814). The onset of rGO degradation occurs around 325° C. and there is approximately 84% of the mass remaining at 800° C. While the profiles are similar, the rGO-dd materials' onset of degradation occurs at lower temperatures and the final masses decrease to 79%, 76%, and 73% for the 3, 14, and 28-day reaction times, respectively. While some of this degradation is likely explained by a similar range of molecular structures noted in the rGO analysis, the fact that degradation increases with reaction time suggests that this difference in mass loss is related to the alkyl functionalization. Given that the total mass loss is increasing with reaction time, it stands to reason that the longer reaction times are allowing more dodecyl chains to graft to the rGO substrate. While it is tempting to assign these differences in mass loss as an extent of functionalization, it remains convoluted due to the complex nature of rGO chemistry. For example, one potential source of complication in this measurement is the introduction of defects from the alkylation reaction and how they might impact rGO degradation. For example, if it is assumed that the dodecyl chains are being removed during the ramp up to 500° C., it would be expected to observe similar degradation profiles between 500 and 800° C. Across this temperature range, each of the profiles are relatively smooth with no abrupt features; however, there is a significant difference in the slope between rGO and the rGO-dd samples. The slope of the rGO profile is steeper than any of the rGO-dd samples, suggesting it is losing more mass across this temperature range. If these mass losses were exclusively a signature of slight defects in the rGO structure, it would be expected that the slopes would be more consistent between samples than observed in these experiments. One possible explanation for this observation is that the alkylation reaction is introducing basal plane or peripheral defects to the rGO structure that are susceptible to thermal degradation at lower temperatures, thereby inflating the apparent amounts of grafted dodecyl chains. It bears mentioning that no evidence of residual NMP (b.p.=202° C.) is observed in any thermograms of the functionalized samples.

ii) X-Ray Photoelectron Spectroscopy (XPS)

Figure 3:
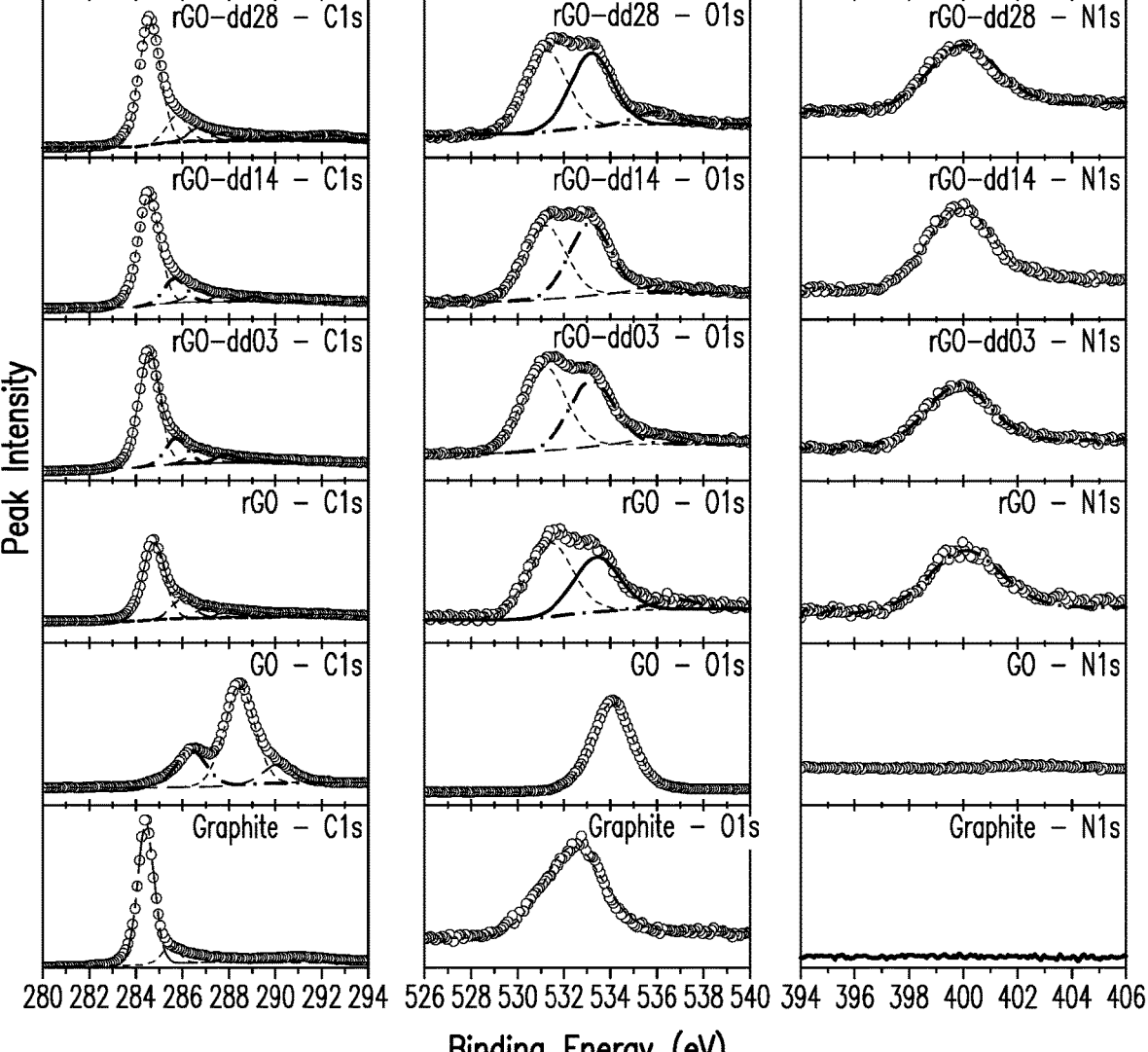
FIG. 3 shows X-ray photoelectron spectroscopy (XPS) spectral peaks corresponding to C1s, O1s, and N1s, respectively. The rows represent each material investigated in this study including graphite, GO, rGO, and each rGO-ddXX as denoted in the upper right-hand corner of each spectrum. XX denotes the reaction time in days.

XPS was used to monitor the changes in elemental composition and types of bonding as a function of reaction time. These results are shown in FIG. 3 in an array of columns for C, O, and N measurements while each row represents a different sample. As a reference point, the graphite flake starting material and GO intermediate were included with the rGO and rGO-dd samples. Each plot contains the raw data points (circles) and lines representing models used to fit the observed peaks. Peak areas with appropriate sensitivity factors were used to estimate the elemental composition of each product and a summary of these values are presented in Table 1. Analysis of the graphite flake confirms predominance of C (96%) with a small presence of O (4%). The most intense peak at 284.4 eV is attributed to a $sp^2$ C and is typical of graphene-type compounds. Also evident from the fit of the graphite C spectrum are two peaks at 286.3 corresponding to C—O bonds and 287.7 eV that are attributed to the presence C=O. The O content is comprised of 70% C=O (533 eV) and 30% C—O (535.9 eV) moieties, which is consistent with other XPS investigations of graphite. No trace of N was observed in the graphite flake starting material.

TABLE 1

Elemental composition and ratios for rGO and rGO-dd samples obtained from XPS data analysis. Nitrogen only occurs from hydrazine reduction and is used to further support an increasing overall C with increasing reaction time.

| | C | O | N | C:O | C:N |
|---|---|---|---|---|---|
| Graphite[a] | 96.2 | 3.8 | 0 | 25.3 | — |
| GO | 59.6 | 40.4 | 0 | 1.5 | — |

TABLE 1-continued

Elemental composition and ratios for rGO and rGO-dd samples obtained from XPS data analysis. Nitrogen only occurs from hydrazine reduction and is used to further support an increasing overall C with increasing reaction time.

| | C | O | N | C:O | C:N |
|---|---|---|---|---|---|
| rGO | 84.5 | 9.9 | 5.6 | 8.5 | 9.9 |
| rGO-dd03 | 84.6 | 10.7 | 4.7 | 8.6 | 17.7 |
| rGO-dd14 | 85.8 | 9.6 | 4.5 | 8.9 | 19.1 |
| rGO-dd28 | 87.3 | 8.5 | 4.2 | 10.2 | 20.5 |

[a]Graphite was purchased from Alfa Aesar

Upon oxidation to form GO, the C content decreases to 60% and the O content increases to 40%, which is consistent with existing reports in GO and rGO literature. The C signal also broadens and analysis of the C spectrum suggests there are four main species present in the GO material: C=C at 285.1 eV, C—O at 286.5 eV, C=O at 288.4 eV, and O—C=O at 290.1 eV. By analysis of the O1s scan, the predominant peak at 535 eV corresponds to C—O species, resulting from the various epoxy, alcohol, and carboxylic acid groups that are known to form in the modified Hummer's method. The fits are used to calculate a C:O ratio of 1.5:1.0, indicating an increase in the extent of oxidation. Upon reduction with hydrazine we see the elemental composition change by a decrease in O to 9.9%, C increase to 84.5%, and the emergence of 5.6% N. The removal of O causes a significant increase in the C:O ratio to 8.5. By fitting the peaks, several different types of C bonded moieties occur: The major peak at 284.5 eV corresponds to a C—C species and moving to higher energies, peaks corresponding to C—N (286 eV), C—O (287 eV), C=O (288 eV), and a variety of carboxyl peaks (289 eV) are observed. The C XPS spectrum and fits are consistent with previous investigations of rGO compounds. The N content arises from the hydrazine reduction process that installs various N-containing moieties on the rGO nanoparticles and a C:N ratio of 9.9 is noted.

The XPS spectra of the rGO-ddXX samples offer further evidence of the successful attachment of dodecyl chains to the rGO nanoparticle. First, an increase in the C:O and C:N ratios is observed. Not only are these ratios greater than that of rGO, but they increase with reaction time, which is in agreement with the results observed from TGA. There is also a relative increase in the intensity of the C—C signal at 285 eV due to the added $sp^3$ C species from the dodecyl chains. This is further supported by an increase in signal intensity in the carboxyl region of the spectra (≈288 eV) that would result from the formation of ester linkages during functionalization. The O scans exhibit an increase in intensity of the ester signal at 533.5 eV in the dodecyl functionalized samples that is more apparent at 14 and 28 days. Under high temperature conditions, it has been reported that NMP can ring open to oligomerize. Following a similar ring-opening process, there could be functional groups originating from NMP that attach to the reduced graphene oxide disks. The fact that the N1s signal remains unchanged between rGO and each of the dodecyl functionalized samples suggests that any N content originates from the hydrazine reduction process and not NMP used as the solvent. Furthermore, this observation also serves as confirmation that any residual NMP was removed during the rGO-dd workup process. By this reasoning, the additional O content arises due to a retainment of ether linkages from the alkylation reaction. The fact that N content is constant also offers further support of successful dodecyl chain coupling as C:N ratios for the rGO-ddXX samples increase with reaction time.

iii) Raman Spectroscopy Analysis

Figure 4:
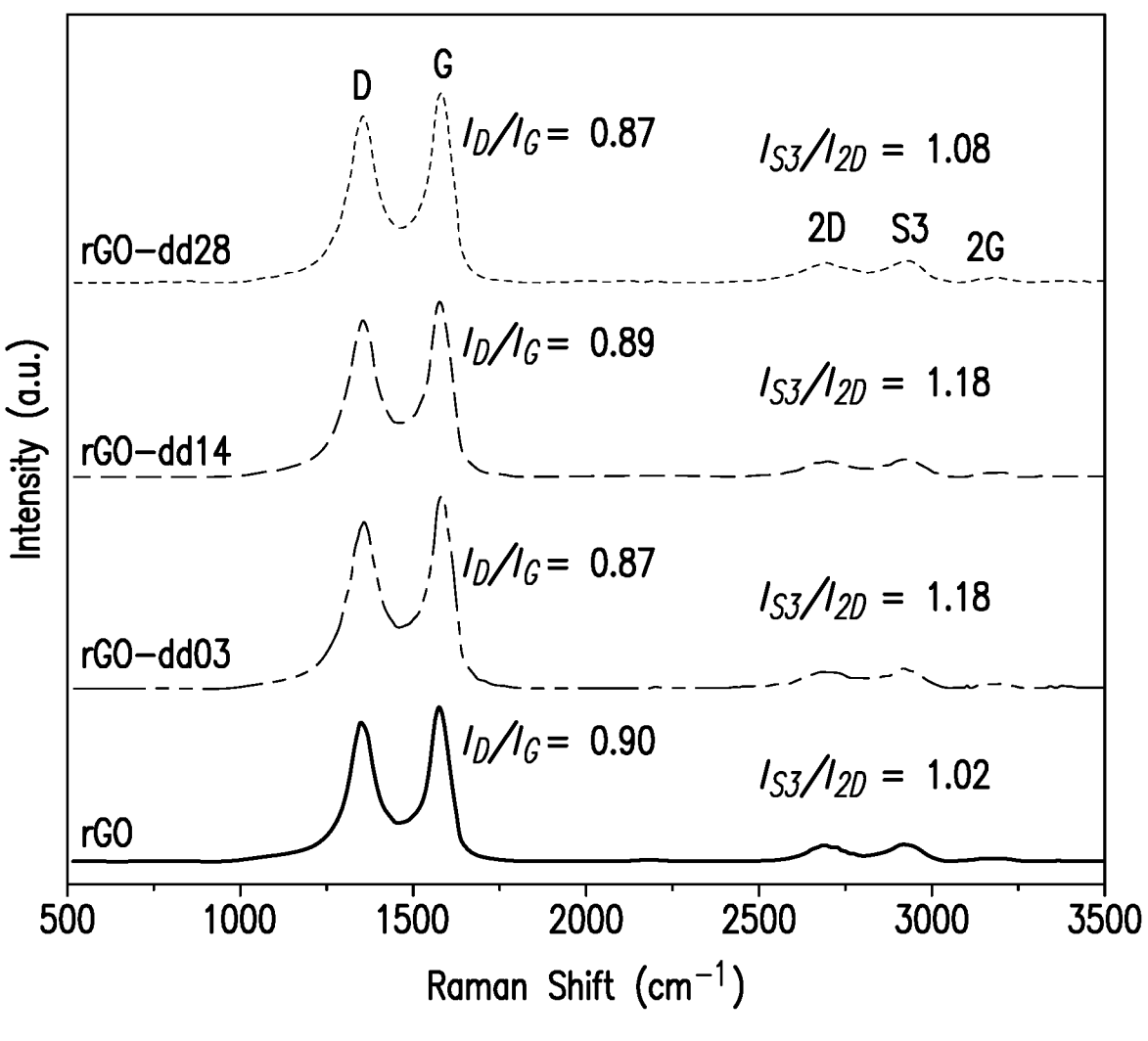
FIG. 4 shows Raman spectra of rGO (black), rGO-dd03 (red), rGO-dd14 (blue), rGO-dd28 (magenta).

Raman spectroscopy measurements were performed to determine the order of the rGO before and after chemical modification. The first-order spectrum of the rGO products share strong D (1355 cm$^{-1}$) and G ($\approx$1580 cm$^{-1}$) bands common for rGO materials. The G bands originate from in-plane stretching of the C—C bonds within the basal plane of the graphene structures. The D band is induced by structural disorder such that it is absent in a perfect graphene sample with no defects. These peaks are accompanied by corresponding $2^{nd}$ order overtone (second harmonic) signals at 2700 cm$^{-1}$ for 2D and 3240 cm$^{-1}$ for 2G. A $3^{rd}$ band at 2920 cm$^{-1}$, denoted as S3, originates from lattice disorder and is caused by the interference of the two modes that give rise to the first order D and G bands. While the D and G bands have been used to characterize the degree of disorder in previous studies, the D band has been shown to be dependent on the length between defects, $L_D$, in graphene materials, which complicates this type of analysis. Alternatively, rGO defects can be quantified by the ratio of the 2D and S3 signal intensities ($I_{S3}/I_{2D}$) as they are insensitive to $L_D$ fluctuations. These values have been calculated and are given in FIG. 4, and are consistent with similar rGO measurements from other reports. Examination of the increasing $I_{S3}/I_{2D}$ values for the rGO-dd samples is indicative of more disorder than the unmodified rGO. Nevertheless, the changes in $I_{S3}/I_{2D}$ are relatively small suggesting the rGO-dd is still capable of achieving similarly ordered states as the rGO.

iv) Electrical Conductivity Measurements

Electrical conductivity measurements of pressed films from each material were recorded using a four-point line probe to identify any significant changes in the electronic properties of rGO upon dodecyl functionalization. These results are summarized in Table 2. A conductivity of 2900 S/cm was recorded for the graphite starting material and is in sufficient agreement with previous reports considering the difference in sample preparation and measurement technique. The rGO exhibits an order of magnitude reduction in conductivity to $\approx$750 S/cm, which is a consequence of the damaged sp$^2$ network and presence of various functional groups. Our observed conductivity for rGO is in good agreement with the best chemically reduced rGOs in the literature. Upon functionalization, there is a decrease in electrical conductivity to approximately 400 S/cm, but it is still sufficiently conductive for many applications. Interestingly, there is not a clear trend between reaction time and conductivity in these measurements. However, these results correspond to the order inferred from the $I_{S3}/I_{2D}$ ratios of the Raman analysis, in which rGO has the highest conductivity and most order with the rGO-dd03 and rGO-dd14 having the least order and lowest electrical conductivities.

TABLE 2

Resistivity and electronic conductivity of rGO and rGO-dd pressed pellets after annealing at 120° C. overnight to remove any moisture.

| Material | t [mm] | ρ [Ω-cm] | σ [S cm$^{-1}$] |
|---|---|---|---|
| Graphite Flake | 0.20 | 3.4 × 10$^{-4}$ | 2.9 × 10$^3$ |
| rGO | 0.14 | 1.3 × 10$^{-3}$ | 7.5 × 10$^2$ |
| rGO-dd03 | 0.17 | 2.7 × 10$^{-3}$ | 3.8 × 10$^2$ |
| rGO-dd14 | 0.17 | 3.0 × 10$^{-3}$ | 3.4 × 10$^2$ |
| rGO-dd28 | 0.17 | 2.3 × 10$^{-3}$ | 4.4 × 10$^2$ | v) Scanning Electron Micrographs (SEMs)

SEM images of the films demonstrate a drastic difference in the surface texture between the rGO and rGO-dd films. Top-down views of the films are shown in FIG. 5, Images A-D depict the surface as viewed from above and images E-H observe the cross sections after liquid nitrogen fracturing. The rGO exhibits a rough texture with pronounced jagged edges (Image A and E) and a relative abundance of "void" space when compared to the films of the functionalized rGO. This morphology could arise due to the increased aggregation of rGO that would provide less opportunity for rGO particles to reorganize during film pressing. On the contrary, surfaces of the rGO-dd films appear smoother and more uniform. They are also marked by the appearance of individual sheets of rGO-dd that appear pressed onto the surface of the film. These features suggest the alkylation is providing more opportunity to reorganize into a layered morphology, presumably due to the smaller size and reduced aggregation after purification. In the cross-sectional images of the films, the edges of each type of rGO or rGO-dd particle is exposed. Like its surface, the rGO features jagged edges with significant void space surrounding each particle. In the functionalized counterparts, there is stronger and more oriented layering between the rGO-dd structures. Furthermore, the edges appear more rounded, which might arise from the addition of the dodecyl chains. It seems pertinent to emphasize that rGO and rGO-dd are each recovered via filtration, dried in vacuum, and pressed into films. Therefore, these apparent differences in morphology could arise due to the difference in dispersion behavior, or be a result of the film pressing process.

vi) Dispersibility in Various Solvents

Figures 6A, 6B:
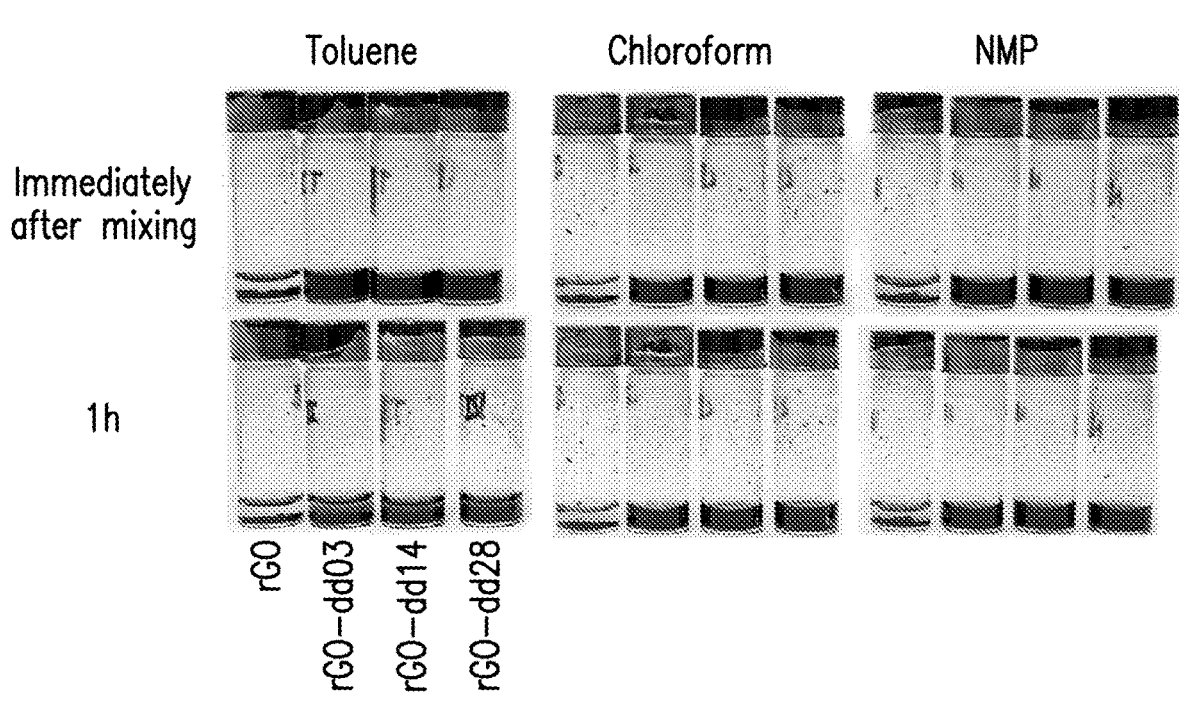
FIG. 6A demonstrates dispersibility comparison of rGO, rGO-dd03, rGO-dd14, and rGO-dd28 (listed in a repeating pattern) in toluene, chloroform, and NMP, respectively. The images were captured after agitation and after the vials were rested for 1 h.
FIG. 6B shows spray coated film of (A) rGO-dd14 film at 1× thickness and (B) 3× thickness alongside drop casted films of (C) rGO-dd14 and (D) rGO-dd28. All films are processed from chloroform.

FIG. 6A demonstrates dispersibility comparison of rGO, rGO-dd03, rGO-dd14, and rGO-dd28 (listed in a repeating pattern) in toluene, chloroform, and NMP, respectively. The images were captured after agitation and after the vials were rested for 1 h. Compared to unmodified rGO, the rGO-dd nanoparticles exhibited enhanced dispersion in toluene, chloroform, and NMP. After addition of each solvent to achieve 10 mg/mL, dispersions were achieved by vortexing at room temperature for 30 s. Images were recorded immediately upon mixing and again after resting for 1 h, at which point it is clear that the rGO-dd compounds are precipitating out of the toluene dispersion faster than the chloroform or NMP analogues, which exhibit no apparent changes in appearance. Furthermore, the dispersions in toluene exhibit an apparent trend of increasing dispersion stability with longer reaction times, marking one of the only observed differences in processability between rGO-dd03, rGO-dd14, and rGO-dd28. While we have focused on dispersion stability at 1 h timescales, which we feel is sufficient for many processing strategies, it is worth noting that stable NMP dispersions exceeding 1 year have been observed in storage with minimal handling. The ability to disperse into solvents such as toluene and chloroform is promising for solution-based processing of electrodes, interfacial layers, and coatings. As a demonstration, similar chloroform dispersions were used to fabricate thin films of rGO-dd14 and rGO-dd28 via drop casting and spray coating from chloroform onto glass substrates treated with dodecyl phosphonic acid.

FIG. 6B shows spray coated film of (A) rGO-dd14 film at 1× thickness and (B) 3× thickness alongside drop casted films of (C) rGO-dd14 and (D) rGO-dd28. All films are processed from chloroform. Films (A) and (B) are spray coated and (C) and (D) are drop casted. For both casting techniques, the films exhibited poor adhesion on bare glass substrates that was slightly improved by treating the substrate with dodecyl phosphonic acid. Spray coated films exhibited higher sheet resistances of 2,000±200 Ω-sq when sprayed with one pass (A) or 200±30 Ω-sq when sprayed with three passes (B). The drop casted films exhibit lower sheet resistances of 26.8±3.4 Ω-sq and 29.2±4.5 Ω-sq for rGO-dd14 (C) and rGO-dd28 (D), respectively. The spray casted films appear rougher and the coverage is less uniform than the drop casted films, which is likely the culprit for the increased sheet resistances observed in these films.

vii) Galactic Cosmic Ray (GCR) and Solar Particle Event (SPE) Radiation

Figure 7:
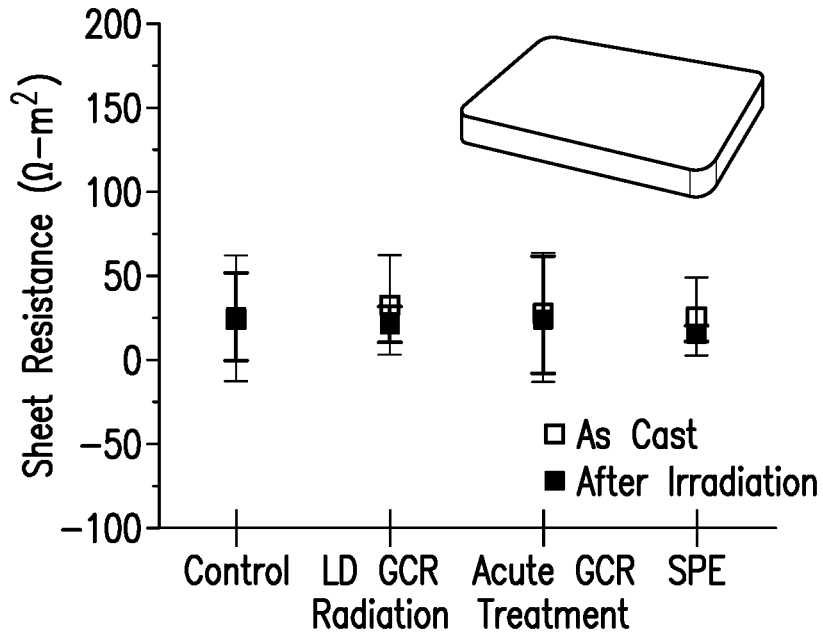
FIG. 7 shows sheet resistances for laminated rGO-dd14 before and after exposure to different types of simulated space radiation events as denoted by low dose galactic cosmic ray (LD GCR), acute GCR, and solar particle event (SPE).
Figures 8A, 8B, 8C, 8D, 8E, 8F, 8G, 8H:
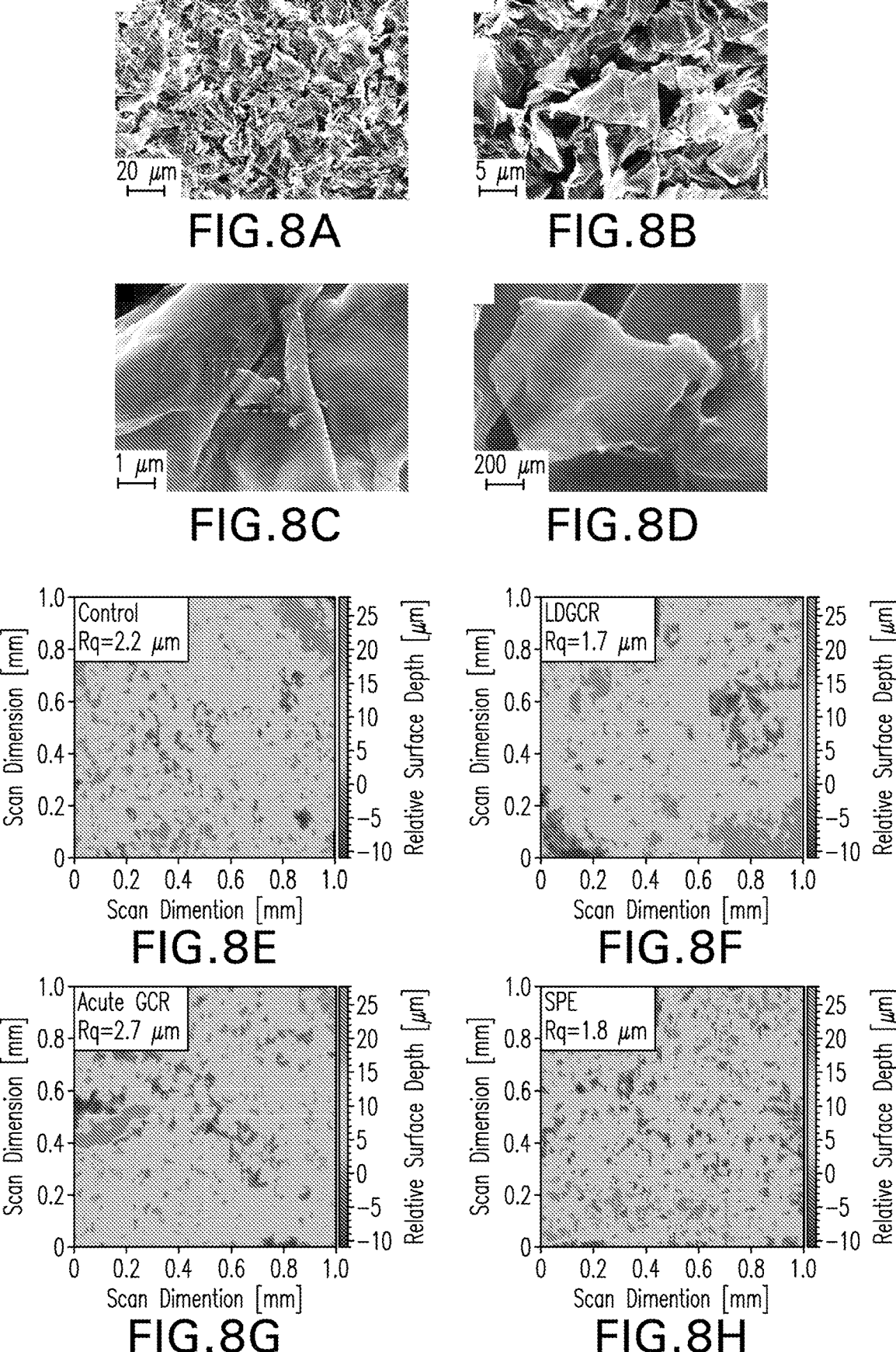
FIG. 8A to FIG. 8D shows scanning electron micrographs (SEMs) of irradiated rGO-dd laminate layer. Images were progressively zoomed in to capture the surface texture to a single rGO-dd sheet resting on the surface (FIG. 8A-FIG. 8D).
FIG. 8E to FIG. 8H shows profilometry scans of the Control (FIG. 8E), LD GCR (FIG. 8F), Acute GCR (FIG. 8G), and SPE (FIG. 8H) irradiated samples.

The radiation tolerance of the modified rGO was assessed using simulated galactic cosmic ray (GCR) and solar particle event (SPE) radiation at the NASA Space Radiation Laboratory at Brookhaven National Laboratory. RGO-dd coatings were applied to high density polyethylene substrates (2.2 cm×2.2 cm) via drop casting from chloroform solution and then thermally annealed to improve adhesion. The radiation type, dose rate, and dose are summarized for each of these treatments in Table 3 and Table 4. Radiation treatments were selected to simulate space radiation events such as galactic cosmic rays (GCRs) and solar particle events (SPEs) that might be encountered on a round trip to Mars. Considering the radiation types and energies used, most of the radiation would pass through the samples with little observable effect. Energy absorbed by our composites could lead to the formation of radical electrons that would then initiate a variety degradation mechanism depending on the atoms/materials in the local environment Acute and low dose rate (LDR) GCR treatments were used to identify any rate dependency on rGO-dd degradation, where the dose rate of acute measurements would double that of the LDR. The measurements were performed at room temperature and open to atmosphere. FIG. 7 shows sheet resistances for laminated rGO-dd14 before and after exposure to different types of simulated space radiation events as denoted by low dose galactic cosmic ray (LD GCR), acute GCR, and solar particle event (SPE). A comparison of the before and after sheet resistances is shown in FIG. 7 alongside an image of an example irradiated sample. All samples exhibited sheet resistances of ≈25 Ω-sq. that did not significantly change after irradiation treatments.

TABLE 3

Galactic Cosmic Ray Irradiation Schedule

| | Acute Dose | | Low Dose | |
|---|---|---|---|---|
| Ion Species | Dose Rate cGy/min | Dose cGy | Dose Rate cGy/min | Dose cGy |
| P1000 | 18.5 | 28.00 | 0.41 | 28 |
| Si600 | 1.3 | 8.00 | 0.35 | 0.8 |
| He250 | 1.6 | 14.40 | 0.38 | 14.4 |
| O350 | 9.7 | 4.80 | 0.27 | 4.8 |
| Fe600 | 7.4 | .80 | 1.21 | 0.82 |
| P250 | 25.3 | 31.20 | 0.41 | 31.2 |

TABLE 4

Solar Particle Event Irradiation Schedule

| | Acute Dose | |
|---|---|---|
| Proton Energies MeV | Dose Rate cGy/min | Dose cGy |
| 50 | 0.44 | 36.7 |
| 60 | 0.46 | 1.17 |
| 70 | 0.44 | 0.81 |

TABLE 4-continued

Solar Particle Event Irradiation Schedule

| | Acute Dose | |
|---|---|---|
| Proton Energies MeV | Dose Rate cGy/min | Dose cGy |
| 80 | 0.39 | 0.60 |
| 90 | 0.42 | 0.42 |
| 100 | 0.36 | 0.32 |
| 110 | 0.33 | 0.22 |
| 120 | 0.34 | 0.15 |
| 130 | 0.34 | 0.11 |
| 140 | 0.36 | 0.08 |
| 150 | 0.26 | 0.06 | viii) Scanning Electron Micrographs (SEMs) and X-Ray Photoelectron Spectroscopy (XPS) Spectra FIG. 8A to FIG. 8D shows scanning electron micrographs (SEMs) of irradiated rGO-dd laminate layer. Images were progressively zoomed in to capture the surface texture to a single rGO-dd sheet resting on the surface (FIG. 8A-FIG. 8D). Large macrostructures ranging from 5-20 μm in diameter are often surrounded by voids appearing as dark regions in the FIG. 8A-FIG. 8B. Upon zooming in further, as in FIG. 8C-FIG. 8D, a smaller rGO-dd nanosheet (≈1.2 μm across) is observed resting on two larger rGO-dd structures. From the SEM analysis, two morphological effects emerge that are likely contributing factors to the relatively high sheet resistances of the laminates compared to rGO-dd pellets. First, when compared to the rGO-dd pressed pellets (FIG. 5), which featured a smoother surface with many overlapping rGO-dd structures, the laminate layers exhibit a general lack of orientation between rGO-dd sheets. Additionally, dark regions outlining the rGO-dd surface features are often accompanied by empty volume beneath the surface, somewhat resembling a forest canopy. These void spaces essentially act as boundaries that increase the path length of charges as they are forced down into the subsurface structures to facilitate inter-particle charge transfer.

Figure 9:
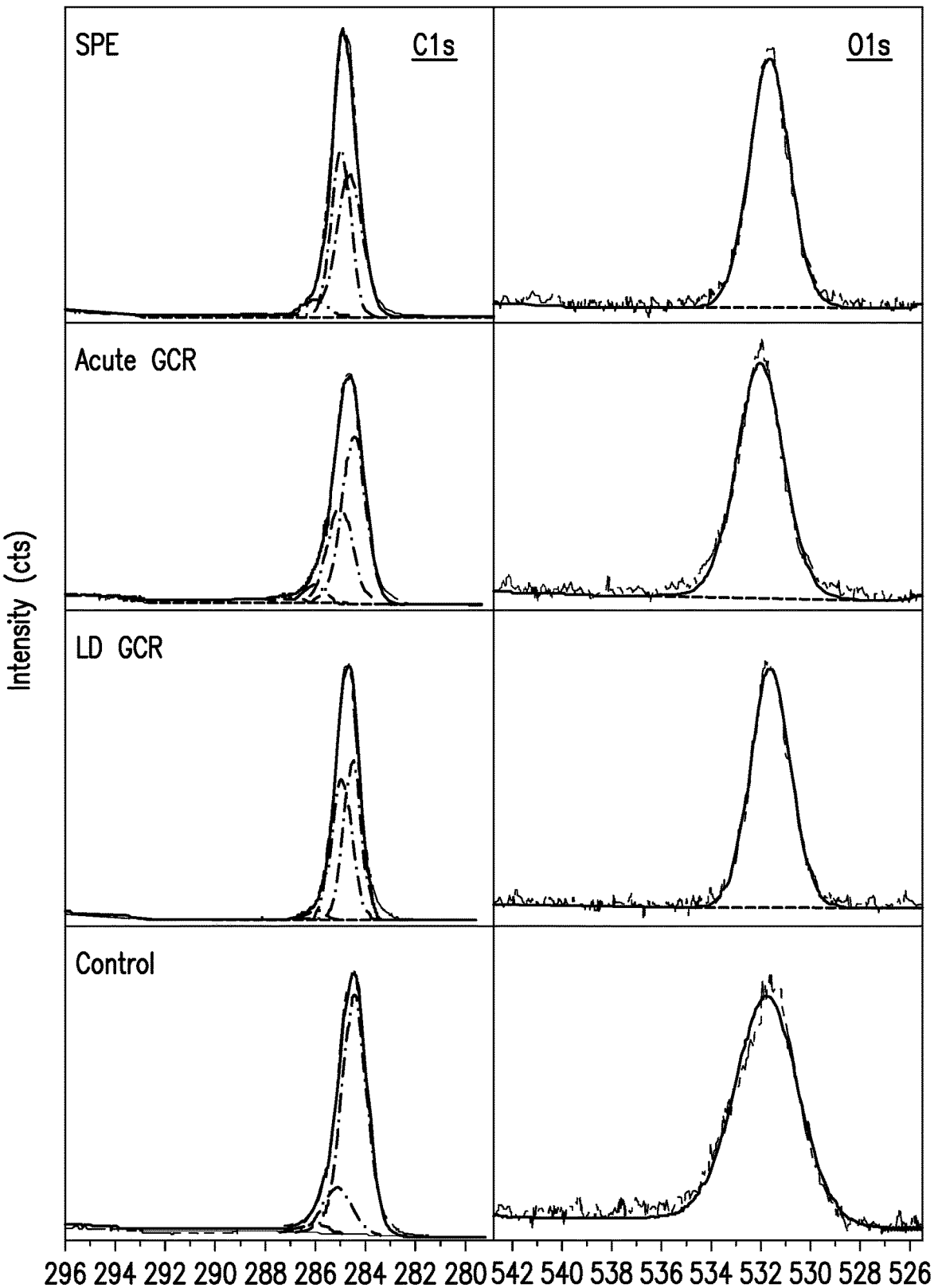
FIG. 9 shows X-ray photoelectron spectroscopy (XPS) spectra of irradiated rGO-dd laminate films atop HPDE.

This general topography was assessed over a larger area (≈1 mm²) using profilometry. FIG. 8E to FIG. 8H shows profilometry scans of the Control (FIG. 8E), LD GCR (FIG. 8F), Acute GCR (FIG. 8G), and SPE (FIG. 8H) irradiated samples. These results confirm that the surfaces are mostly uniform with sparse regions of intense depth/height deviation (on the order of 5-10 μm). Overall, the topology of each surface is visually similar and there is strong consistency between roughness values (from 1.7-2.5 μm) for each sample. FIG. 9 shows X-ray photoelectron spectroscopy (XPS) spectra of any chemical changes of irradiated rGO-dd laminate films atop HPDE. Columns correspond to peaks for C1s and O1s signals. Each row represents a different irradiation treatment including SPE, acute GCR, LD GCR, and a control. Each spectrum is dominated by large C peaks from the HDPE substrate that limit the sensitivity of the technique. No chemical changes are observed between the control and any of the irradiated samples. These measurements are marked by strong C1s signals, presumably originating from HDPE that blended with rGO-dd during thermal annealing. Accurate description of the signal required two main peaks at 284.4 eV and 28+4.9 eV arising from sp² and sp³ carbon, however accurate deconvolution is complicated by local variations in the amount of HDPE. Furthermore, the dominance of these peaks limits the sensitivity of the measurement to changes in C signals with higher binding energies. With this limited detection threshold in mind, no significant chemical changes are observed. While preliminary, the lack of observable changes in sheet resistance, topography, and XPS suggest that rGO-dd has potential to serve as a robust means of surface modification to reliably enhance electrical properties many applications in space.

III. Polymeric Nanoparticle Composites

Polymeric nanoparticle composites and methods for making and using the same are provided. In one embodiment, polymeric nanoparticle composite can include a dispersion of polymer matrix and chemically functionalized graphene oxide nanoparticles.

In one embodiment, the polymer matrix comprises a thermoplastic polymer, a thermosetting polymer or combinations thereof.

In other embodiments, the thermoplastic polymer is selected from the group consisting of polyesters, polyethylene, polypropylene, polyvinyl chloride, silicones, acrylic polymers, fluoropolymers, polyurethanes, polystyrene, polyimide, or combinations thereof.

In some embodiments, the thermosetting polymer is selected from the group consisting of epoxies, epoxy-polyester hybrids, phenolics, melamines, urethanes, or combinations thereof.

In further embodiments, the polyethylene is selected from the group consisting of low density polyethylene (LDPE), linear low density polyethylene (LLDPE), high density polyethylene (HDPE), medium density polyethylene (MDPE), ultra-high molecular weight polyethylene (UHMWPE), cross-linked polyethylene (XLPE), or combinations thereof.

In one embodiment, the polyethylene is high density polyethylene (HDPE).

In some embodiments, the chemically functionalized graphene oxide nanoparticles comprise reduced graphene oxide nanoparticles, alkylated graphene oxide nanoparticles, alkylated reduced graphene oxide nanoparticles, or combinations thereof.

In other embodiments, the dodecyl reduced graphene oxide nanoparticle has electrical conductivity of about $1 \times 10^{-7}$ S/m to about $1 \times 10^4$ S/m.

In another embodiment, the chemically functionalized graphene oxide nanoparticle has a thickness of about 2 nm to about 4 nm and diameter of about 5 μm to about 40 μm.

In other embodiment, a method for preparing a polymeric nanoparticle composite can include melting the polymer via heating at 190° C., adding chemically functionalized graphene oxide nanoparticles to molten polymer to form a matrix, pressing the matrix flat, cooling the matrix to room temperature followed by cutting the matrix into small pieces, adding small pieces of matrix into an extruder, stirring and heating the matrix for 2 h at 180° C. using a screw speed of 100 rpm, removing the matrix from the extruder, placing the matrix into a Carver hot press, and pressing the matrix at 180° C. for 5 min to form films of polymeric nanoparticle composite.

In one embodiment, the polymer is high density polyethylene (HDPE).

In some embodiments, the chemically functionalized graphene oxide nanoparticles comprise reduced graphene oxide nanoparticles, alkylated graphene oxide nanoparticles, alkylated reduced graphene oxide nanoparticles, or combinations thereof.

Methods for synthesizing an alkylated reduced graphene oxide nanoparticles are provided.

In another embodiment, a method for synthesizing an alkylated reduced graphene oxide nanoparticle can include reacting graphite flakes with potassium permanganate and sulfuric acid at 80° C. to form a graphene oxide (GO), reacting the graphene oxide (GO) with a base in N-methyl-2-pyrrolidone (NMP) and an alkyl halide at 60° C. to form an alkylated graphene oxide (A-GO), and reducing the alkylated graphene oxide (A-GO) with hydrazine hydrate to form an alkylated reduced graphene oxide (A-rGO) nanoparticle.

In one embodiment, the base is sodium hydride and the alkyl halide is dodecyl bromide.

A. Synthesis

Figure 10:
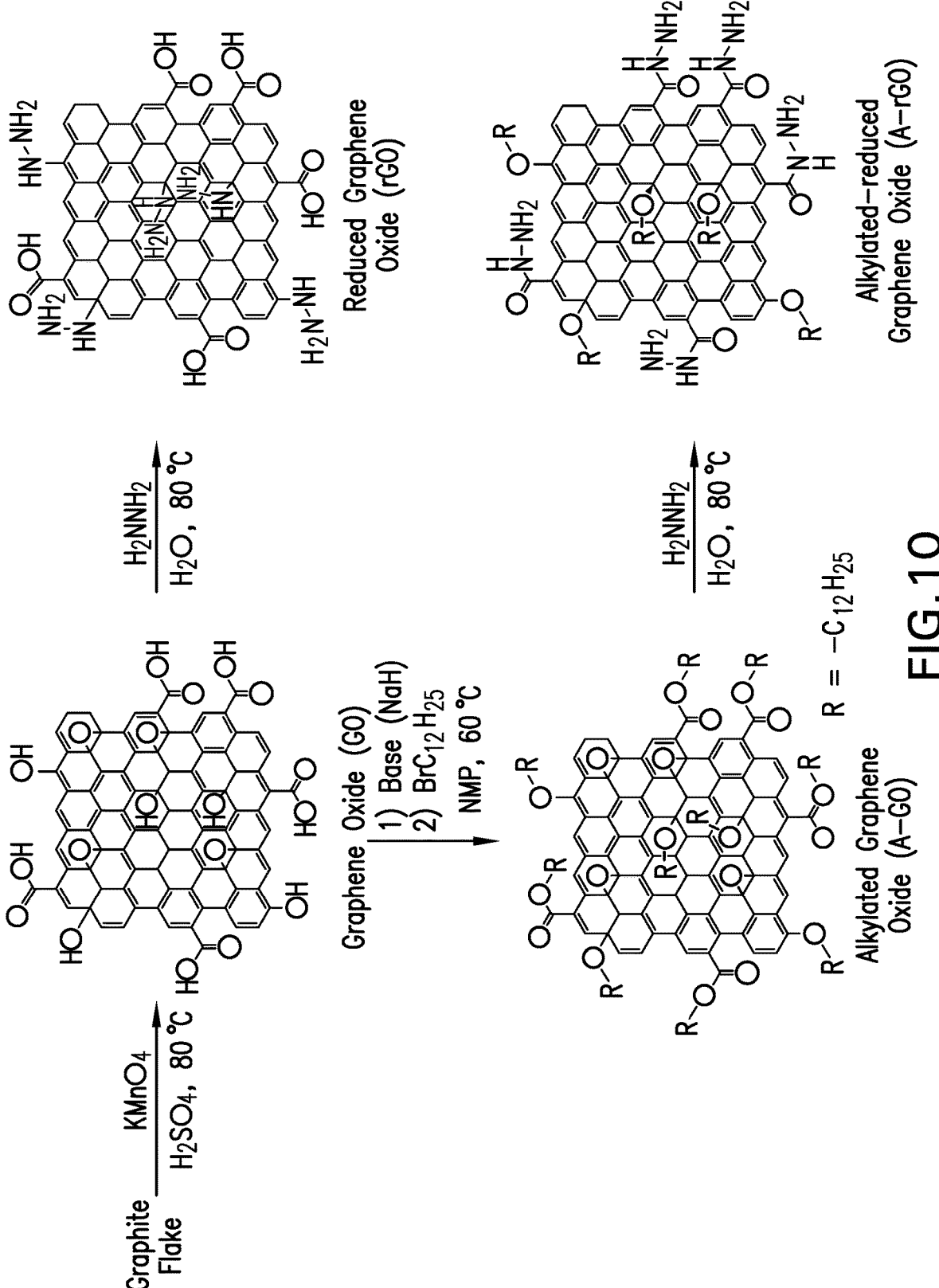
FIG. 10 shows synthesis of reduced graphene oxide (rGO) and alkylated reduced graphene oxide (A-rGO)

Reaction scheme for the synthesis of reduced graphene oxide (rGO) and alkylated reduced graphene oxide (A-rGO) is given in FIG. 10 and described in Example 3. This synthetic route provides a unique opportunity to obtain a chemically functionalized reduced graphene structure. The visual appearance of rGO and A-rGO are indistinguishable. As a solid, both are a deep black color typical of graphene. The added dodecyl chains of the A-rGO confer increased dispersibility in acetonitrile and n-methyl pyrrolidone (NMP) compared to rGO. Numerous characterization techniques were used to confirm the attachment of dodecyl chains in the A-GO and A-rGO samples as given below.

B. Characterization i) Elemental Analysis

Elemental analysis was used to measure the atomic ratios of C, H, N, and O and these results are summarized in Table 5 and Example 4. GO features the highest O levels (50.6%) and lowest C (47.1%) of the sample set, resulting in a C:O ratio of 0.93. After reducing GO with hydrazine, a C:O ratio of 4.61 was measured, reflecting the significantly lower levels of O (16.5%). The A-GO product features similar C and O levels of GO but also includes significantly more H, presumably due to the dodecyl functionalities. After reduction, the C:O ratio increases from 1.21 to 2.90, which is substantially lower than the unmodified rGO. This difference is due to the ether linkages of the dodecyl functionalities that are not removed during hydrazine reduction. Trace amounts of N are observed in the rGO, A-GO, and A-rGO samples that arise from two different mechanisms. First, in the chemically reduced samples, rGO and A-rGO, hydrazine accounts for a portion of the N, as it has been shown to install pyrazole-like functionalities about the edge of the GO ring (Park, S.; Hu, Y.; Hwang, J. O.; Lee, E. S.; Casabianca, L. B.; Cai, W.; Potts, J. R.; Ha, H. W.; Chen, S.; Oh, J.; Kim, S. O.; Kim, Y. H.; Ishii, Y.; Ruoff, R. S. *Nat. Commun.* 2012, 3, 638). The second N source could be NMP, which was chosen as the solvent for the Williamson-ether synthesis for its superior ability to dissolve GO (Konios, D.; Stylianakis, M. M.; Stratakis, E.; Kymakis, E. *J. Colloid Interface Sci.* 2014, 430, 108-112). Under high temperature conditions, it has been reported that NMP can ring open and attach to the basal plane of the resulting graphene oxide disks (Dubin, S.; Gilje, S.; Wang, K.; Tung, V. C.; Cha, K.; Hall, A. S.; Farrar, J.; Varshneya, R.; Yang, Y.; Kaner, R. B. *ACS Nano* 2010, 4, 3845-3852). Although a much lower temperature was used for our synthesis (60° C. compared to 210° C. as reported by Dubin et al. (Dubin, S.; Gilje, S.; Wang, K.; Tung, V. C.; Cha, K.; Hall, A. S.; Farrar, J.; Varshneya, R.; Yang, Y.; Kaner, R. B. *ACS Nano* 2010, 4, 3845-3852), it is likely that the N present in the A-GO sample originated from a similar mechanism.

ii) Fourier-Transform Infrared (FTIR) Structural Characterization

Figure 11:
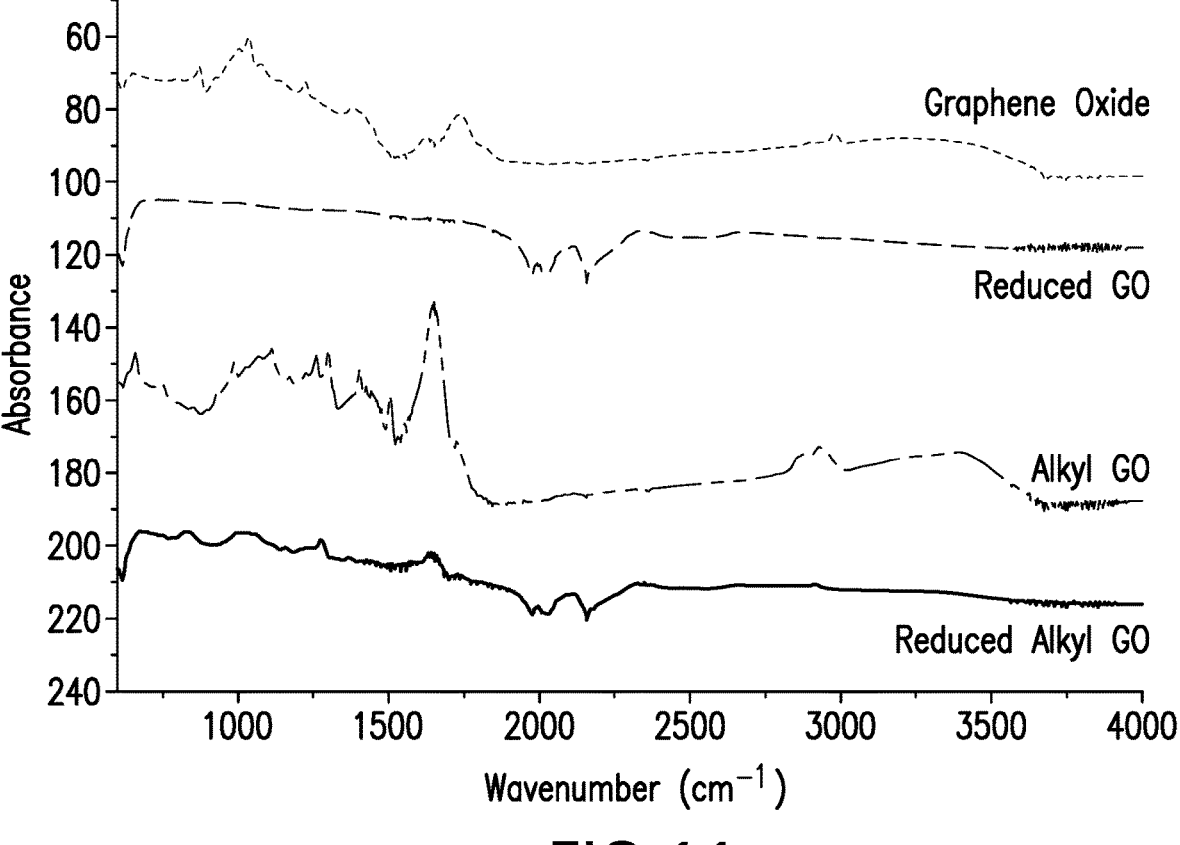
FIG. 11 shows FT-IR spectra of the various graphene products, including, graphene oxide, reduced graphene oxide, alkylated graphene oxide, and reduced alkylated graphene oxide (from top to bottom).

Fourier-transform infrared spectra (FTIR) of each graphene product are shown in FIG. 11 and described Example 5. The GO starting material shown in black is consistent with other reports investigating GO chemistry (Marcano, D. C.; Kosynkin, D. V.; Berlin, J. M.; Sinitskii, A.; Sun, Z.; Slesarev, A.; Alemany, L. B.; Lu, W.; Tour, J. M. *ACS Nano* 2010, 4, 4806-4814). Perhaps most apparent are the broad O—H stretching peaks centered at 3420 cm$^{-1}$ in the unreduced samples. Other major peaks observed in the GO material include a C—H stretch at 2900 cm$^{-1}$, C=O vibration at 1730 cm$^{-1}$, C=C stretch at 1620 cm$^{-1}$, C—O ether stretch at 1230 cm$^{-1}$, and epoxy asymmetric and symmetric stretches at 865 cm$^{-1}$ and 1030 cm$^{-1}$, respectively. The alkylation reaction is confirmed by the shifts of the carbonyl peaks and appearance of new ones in the range of 1230-1500 cm$^{-1}$. The peaks shift to higher wavenumbers as a result of the decrease in conjugation, presumably due to the aliphatic dodecyl chains. These shifts are also accompanied by the formation of a wide doublet peak in the alkane stretch signal at 2800 cm$^{-1}$ that is much more pronounced than unmodified GO.

Upon reduction of GO and A-GO with hydrazine, most of the chemical functionality is removed, as indicated by the relatively flat profile shown in red and magenta. After reduction of the A-GO to A-rGO, shown in pink, there remains a small peak at 2800 cm$^{-1}$ corresponding to the C—H stretch of the alkyl chains. This feature, combined with the presence of the C—O stretch at 1230 cm$^{-1}$, which is consistent with C—O ether stretching, confirms that the final A-GO was successfully reduced with the alkyl chains intact via ether linkages. As expected, the decrease of the carbonyl signal at 1730 cm$^{-1}$ suggests that most of the ester-functionalized dodecyl chains did not survive the reduction process. This is also supported by the significant loss of alkane signal at 2800 cm$^{-1}$ in comparison to A-GO. The rGO and A-rGO samples each feature a medium peak at approximately 2100 cm$^{-1}$ that is not readily identifiable nor shared by the spectra of the unreduced analogues.

iii) Solid-State $^{13}$C Nuclear Magnetic Resonance ($^{13}$C NMR) Spectra

Figure 12:
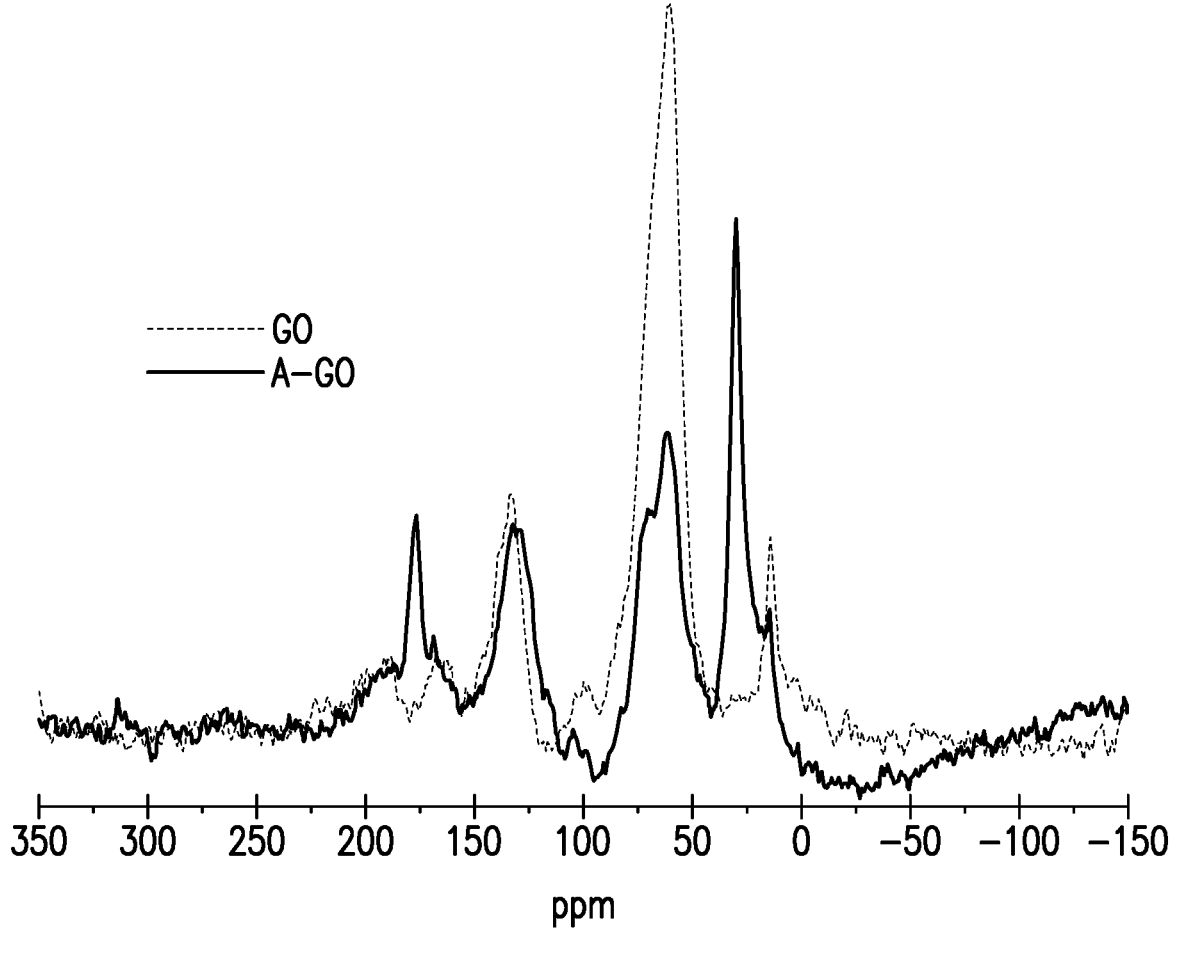
FIG. 12 shows solid-state $^{13}C$ NMR spectra of graphene oxide and alkylated graphene oxide before reduction via hydrazine.

Solid-state $^{13}$C NMR measurements of the graphene oxide before and after functionalization are shown in FIG. 12 and described in Example 6. Many of the features of unfunctionalized GO are consistent with previously reported measurements in the literature (Park, S.; Hu, Y.; Hwang, J. O.; Lee, E. S.; Casabianca, L. B.; Cai, W.; Potts, J. R.; Ha, H. W.; Chen, S.; Oh, J.; Kim, S. O.; Kim, Y. H.; Ishii, Y.; Ruoff, R. S. *Nat. Commun.* 2012, 3, 638; Cai, W.; Piner, R. D.; Stadermann, F. J.; Park, S.; Shaibat, M. A.; Ishii, Y.; Yang, D.; Velamakanni, A.; An, S. J.; Stoller, M.; An, J.; Chen, D.; Ruoff, R. S. *Science* 2008, 321, 1815-1817). Peaks at 140 ppm and 60 ppm correspond to sp$^2$ carbon-carbon bonds of the planar C network. In the A-GO sample, there is an emergence of a strong peak at 30 ppm corresponding to the alkyl chains that were added during the functionalization reaction. Furthermore, there are peaks corresponding to ester and ether functionalities in the A-GO spectra located at 180 ppm. It bears mentioning that alkyl chains grafted via ester linkages will cleave upon hydrazine reduction and therefore be absent in the final A-rGO product. Spectra of rGO and A-rGO were not possible due to the electrical conductivity resulting from reduction.

iv) Electrical Conductivity Characterization

Electrical conductivity measurements were performed as an assessment of the applicability for this type of modification strategy for electronic and spacesuit applications, where conductivity offers protection against electrostatic charges. Pellets of rGO and A-rGO were pressed using an IR pellet press and their resistivity was measured using the van der Pauw method (van der PAUW, L. J. *Phillips Res. Rep.* 1958, 72, 1-9) before and after thermal annealing overnight at 120° C. under vacuum. The results of these measurements are summarized in Table 6 and described in Example 7.

In the as-pressed samples, electrical conductivities of 1.2 S/m and 6.6×10$^{-6}$ S/m were recorded for rGO and A-rGO, respectively. The significant reduction in conductivity of the A-rGO material is explained by two factors. First, the attachment of dodecyl chains on the basal plane of the GO disc hinders restoration of the sp$^2$ network upon hydrazine reduction. The presence of these groups is supported by the increased functionality of the A-rGO observed from FTIR, elemental analysis, and solid-state NMR results discussed previously. Another anticipated effect of the dodecyl chains is that they will prevent interplanar stacking between A-rGO nanoparticles, thereby decreasing the interparticle charge transfer. While this is a drawback regarding electrical conductivity, this effect likely plays a significant role in the enhanced miscibility of the A-rGO in an HDPE matrix.

Another source of insulation could arise from the presence of water or solvent entrapped in the A-rGO materials. To explore this possibility, electrical conductivities were also measured after thermal annealing at 120° C. overnight under vacuum to remove any entrapped water. After thermal annealing, only a marginal enhancement of the conductivity was observed for the rGO sample. Although annealing led to a 10× increase in the conductivity of the A-rGO sample, the resulting conductivity remains low compared to the unmodified rGO counterpart. Therefore, this lack of conductivity is attributed to the abundant functionalization of the A-rGO basal plane.

III. Industrial Applications

Polymeric nanoparticle composites and nanoparticle coatings of the present invention offer several industrial applications including but not limited to, space and military applications such as Electrostatic Discharge Protection— This has immediate applications in space and aerospace flight. For example, fighter jets have antistatic coatings that are constantly reapplied to protect against such discharge. It can also be useful in the design of housings for electronics, where a static charge could be problematic, such as solar cells or batteries. Another big area for this might be manufacturing of shock sensitive materials such as explosives or flammable dust as many catastrophic events have occurred due to electrostatic discharge. Being able to coat plastics in this material will prevent the charges from ever occurring.

Electromagnetic interference shielding—this is another one commonly used in space and aerospace. Almost all communication, measurement, or otherwise precise instruments in these sectors would benefit from advanced EMI shielding devices, and to use these coatings for radar shielding on fighter jets. In general, these conductive layers offer an alternative for an EMI shielding material that can be applied to any plastic, which not only reduces weight compared to metals that are currently used, but is also amenable to a wide range of manufacturing techniques.

Joule heating—this could be used for deicing airplane wings, turbine blades, and propeller blades. Since it heats locally, it may also be useful for warming electronic components that are temperature sensitive in military and space. For space applications, it could also be used to remove condensation from lenses or be used in in-situ resource utilization to remove volatile components frozen inside Lunar and Martian regolith material.

Non-destructive Evaluation of components—Stress or damage to structural components can be monitored by examining changes in electrical properties. This would be relevant for airplane wings, propeller or turbine blades, and otherwise damage-sensitive areas. For space, applications such as the space suit and habitats immediately come to mind as micrometeoroid impacts and damage from prolonged use can be difficult to spot relying solely on visual inspection.

Dust mitigation is mostly limited to space exploration, but could be conceivable in highly sensitive equipment or in manufacturing processes where dust is problematic. It can be used in clean rooms, where conductive layers are used to collect dust.

Additional applications include filtration membranes or biological scaffolds

EXAMPLES

To provide a better understanding of the foregoing discussion, the following non-limiting examples are provided. Although the examples may be directed to specific embodiments, they are not to be viewed as limiting the invention in any specific respect.

Example 1: Synthesis of Reduced Graphene Oxide-dodecyl (rGO-dd)

Reaction scheme for the synthesis of reduced graphene oxide-dodecyl (rGO-dd) is given in FIG. 1.

Step 1: Synthesis of Graphene Oxide (GO)

Graphene oxide was synthesized using the modified Hummer's method (Marcano, D. C.; Kosynkin, D. V.; Berlin, J. M.; Sinitskii, A.; Sun, Z.; Slesarev, A.; Alemany, L. B.; Lu, W.; Tour, J. M. *ACS Nano* 2010, 4, 4806-4814). 3.0 g of graphite flake (Alfa Aesar) and 18.0 g of potassium permanganate were added to a clean 500 mL round bottom flask with a Teflon coated stir bar. A mixture of sulfuric acid (360 mL) and phosphonic acid (40 mL) was prepared in a beaker and slowly added to the RB flask while mixing. Upon complete addition, a septum was used to cap the RB flask, and a vent needle was used to prevent any pressure build up. The reaction mixture was heated to 50° C. and allowed to stir overnight ($\approx$18 h). The reaction was halted by cooling to room temperature and then pouring the contents over 500 mL of ice containing 3 mL of 30% hydrogen peroxide ($H_2O_2$). The graphene oxide product was purified by filtration through glass wool, and centrifuged at 4,000 RCF for 2 h, after which the supernatant was decanted and disposed. The collected solids were dissolved in deionized water, filtered, and centrifuged again. This wash, filtration, and centrifugation process was repeated sequentially using 30% HCl, DI water, and ethanol. The final GO product was suspended in ether and recovered using a 0.45 μm PTFE membrane filter. After drying in vacuum overnight, the resulting GO had a deep brown color.

Step 2: Synthesis of Reduced Graphene Oxide (rGO)

Chemical reduction of GO was performed using hydrazine. 100 mg of GO were added to a clean 250 mL RB flask containing a stir bar with 80 mL of DI water in open atmosphere. After the mixing, the reaction mixture was stirred for 1 h to ensure complete dissolution, anhydrous hydrazine (2 mL) was added to the flask. The flask was immediately equipped with a condenser, capped with a rubber septum, and heated in an oil bath to 100° C. The reaction can be observed almost instantly as the reactor contents begin to precipitate and undergo a color change from a deep brown to black. These conditions were maintained for 48 h to ensure complete reduction of the GO. The rGO product was collected using a nylon membrane filter and washed 5 times using 100 mL of DI water and 100 mL of methanol during each rinse. The final product was dried under vacuum overnight at 60° C.

Step 3: Synthesis of Reduced Graphene Oxide-dodecyl (rGO-dd)

The dodecyl functionalization was performed as follows: 400 mg of dry rGO and 20 mg of NaH was added to a freshly cleaned and dried 500 mL RB flask in a glove box. 350 mL of N-Methyl-2-Pyrrolidone was added via cannula transfer and allowed to stir under Ar gas flow. 1.0 g of dodecylbromide was added via syringe and the reaction mixture was sparged with Ar gas for 15 min. Each reaction was then heated to 60° C. and allowed to react for 3, 14, or 28 days. Upon completion, each reaction was quenched by cooling to room temperature and pouring the contents into $\approx$750 mL of methanol while stirring. The product was recovered using a PTFE filter and washed with methanol three times using $\approx$200 mL each cycle. Products were dried under vacuum at 120° C. to remove any remaining solvents.

Example 2: Preparation of Drop-Cast and Spray-Cast Films on Glass and HDPE Substrates The solutions used to drop cast films on glass and HDPE substrates were prepared as follows: The desired amount of rGO-ddXX was added to a tared vial with a stir bar. Chloroform was added to achieve 10 mg/mL, then the vial was sealed and allowed to stir for 1 h. Drop casting was performed by dispensing approximately 1.5 mL of each dispersion onto each substrate to achieve a coating of 0.3 mL/cm$^2$ and was allowed to dry at room temperature in open air. For the spray casted films, the dispersions were handled with disposable plastic syringes. In the case of HDPE samples used for irradiation studies, the substrates were annealed at 160° C. such that the rGO-dd layers were fully adhered to the surface. In preparing spray casted films, solutions were diluted with chloroform to 5 mg/mL and casted on to glass substrates treated with hexyl dodecyl phosphonic acid. These substrates were prepared by drop casting ddPA:ethanol solutions (10 mg/mL) onto each substrate that were then allowed to rest for 30 minutes followed by rinsing with copious amounts of ethanol.

Example 3: Synthesis of Reduced Graphene Oxide (rGO) and Alkylated Reduced Graphene Oxide (A-rGO)

Reaction scheme for the synthesis of reduced graphene oxide (rGO) and alkylated reduced graphene oxide (A-rGO) is given in FIG. 10.

Step 1: Synthesis of Graphene Oxide (GO)

Graphene oxide was synthesized using the modified Hummer's method (Marcano, D. C.; Kosynkin, D. V.; Berlin, J. M.; Sinitskii, A.; Sun, Z.; Slesarev, A.; Alemany, L. B.; Lu, W.; Tour, J. M. *ACS Nano* 2010, 4, 4806-4814). 3.0 g of graphite flake (Alfa Aesar) and 18.0 g of potassium permanganate were added to a clean 500 mL round bottom flask with a Teflon coated stir bar. A mixture of sulfuric acid (360 mL) and phosphonic acid (40 mL) was prepared in a beaker and slowly added to the RB flask while mixing. Upon complete addition, a septum was used to cap the RB flask, and a vent needle was added to prevent any pressure build up. The reaction mixture was heated to 50° C. and allowed to stir overnight (≈18 h). The reaction was halted by first cooling the reaction to room temperature and then pouring the contents over 500 mL of ice containing 3 mL of 30% hydrogen peroxide ($H_2O_2$). The graphene oxide product was purified by filtration through glass wool, and centrifuged at 4,000 RCF for 2 h, after which the supernatant was decanted and disposed. The collected solids were dissolved in deionized water, filtered, and centrifuged again. This wash, filtration, and centrifugation process was repeated sequentially using 30% HCl, DI water, and ethanol. The final GO product was suspended in ether and recovered using a 0.45 μm PTFE membrane filter. After drying in vacuum overnight, the resulting GO had a deep brown color and was characterized using FTR-IR, solid-state $^{13}$C-NMR, and elemental analysis.
Step 2: Synthesis of Dodecyl-Graphene Oxide or Alkylated-Graphene Oxide (A-GO)

To a clean and freshly dried 3-neck RB flask, 40 mg of sodium hydride were added and sealed using rubber septa in a N2 filled glovebox. In a separate flame-dried pear flask, 0.64 g GO were dissolved in 150 mL of N-methyl-2-pyrrolidone (NMP) and sonicated for 20 min using a Fisher Scientific FS20H ultrasonic cleaner. After complete dissolution, the contents of the pear flask were transferred via cannula into the previously prepared 3-neck RB flask under inert atmosphere. The RB flask was heated to 60° C. and allowed to react for 2 h. In another dried pear flask, 6.1 g of dodecyl bromide (large excess) were diluted with 50 mL of NMP and sparged with argon for 15 min. The dodecyl bromide solution then was transferred via cannula into the reaction flask and allowed to reach 60° C. for 72 h under an argon atmosphere. The reaction was quenched by adding 2-propanol drop-wise until no bubbles were observed. This same quenching procedure was repeated using DI water. The product was precipitated using ether, collected using a cellulose filter, and dried under vacuum for 72 h at 60° C. to remove residual NMP.
Step 3: Synthesis of Reduced Graphene Oxide (rGO) and Synthesis of Alkylated Reduced Graphene Oxide (A-rGO)

The chemical reduction of GO and dodecyl-GO was performed using the same procedure. 100 mg of GO were added to a clean 250 mL RB flask containing a stir bar with 80 mL of DI water in open atmosphere. After the mixing was stirred for 1 h to ensure complete dissolution, anhydrous hydrazine (2 mL) was added to the flask. The flask was immediately equipped with a condenser, capped with a rubber septum, and heated in an oil bath to 80° C. The reaction can be observed almost instantly as the reactor contents begin to precipitate and undergo a color change from a deep brown to black. These conditions were maintained for 18 h to ensure complete reduction of the GO. The rGO product was collected using a nylon membrane filter, and washed 5 times using 100 mL of DI water and 100 mL of methanol during each rinse. The final product was dried under vacuum overnight at 60° C.

Example 4: Elemental Analysis

Elemental analysis was used to measure the atomic ratios of C, H, N, and O and these results are summarized in Table 5. GO features the highest O levels (50.6%) and lowest C (47.1%) of the sample set, resulting in a C:O ratio of 0.93. After reducing GO with hydrazine, a C:O ratio of 4.61 was measured, reflecting the significantly lower levels of O (16.5%). The A-GO product features similar C and O levels of GO but also includes significantly more H, presumably due to the dodecyl functionalities. After reduction, the C:O ratio increases from 1.21 to 2.90, which is substantially lower than the unmodified rGO. This difference is due to the ether linkages of the dodecyl functionalities that are not removed during hydrazine reduction. Trace amounts of N are observed in the rGO, A-GO, and A-rGO samples that arise from two different mechanisms. First, in the chemically reduced samples, rGO and A-rGO, hydrazine accounts for a portion of the N, as it has been shown to install pyrazole-like functionalities about the edge of the GO ring (Park, S.; Hu, Y.; Hwang, J. O.; Lee, E. S.; Casabianca, L. B.; Cai, W.; Potts, J. R.; Ha, H. W.; Chen, S.; Oh, J.; Kim, S. O.; Kim, Y. H.; Ishii, Y.; Ruoff, R. S. *Nat. Commun.* 2012, 3, 638). The second N source could be NMP, which was chosen as the solvent for the Williamson-ether synthesis for its superior ability to dissolve GO (Konios, D.; Stylianakis, M. M.; Stratakis, E.; Kymakis, E. *J. Colloid Interface Sci.* 2014, 430, 108-112). Under high temperature conditions, it has been reported that NMP can ring open and attach to the basal plane of the resulting graphene oxide disks (Dubin, S.; Gilje, S.; Wang, K.; Tung, V. C.; Cha, K.; Hall, A. S.; Farrar, J.; Varshneya, R.; Yang, Y.; Kaner, R. B. *ACS Nano* 2010, 4, 3845-3852). Although a much lower temperature was used for our synthesis (60° C. compared to 210° C. as reported by Dubin et al. (Dubin, S.; Gilje, S.; Wang, K.; Tung, V. C.; Cha, K.; Hall, A. S.; Farrar, J.; Varshneya, R.; Yang, Y.; Kaner, R. B. *ACS Nano* 2010, 4, 3845-3852), it is likely that the N present in the A-GO sample originated from a similar mechanism.

TABLE 5

Elemental analysis (weight percent) of graphene oxide and the various derivatives included in this study. Oxygen was calculated as the remaining mass.

| Material | C | H | N | O | C/O |
|----------|------|-----|-----|------|------|
| GO | 47.1 | 2.3 | — | 50.6 | 0.93 |
| rGO | 76.0 | 1.5 | 6 | 16.5 | 4.61 |
| A-GO | 50.6 | 3.7 | 3.9 | 41.8 | 1.21 |
| A-rGO | 67.4 | 3.3 | 6.1 | 23.2 | 2.90 |

Example 5: Fourier-Transform Infrared (FTIR) Structural Characterization

Fourier-transform infrared (FTIR) spectra of each graphene product are shown in FIG. 11. The GO starting material shown in black is consistent with other reports investigating GO chemistry (Marcano, D. C.; Kosynkin, D. V.; Berlin, J. M.; Sinitskii, A.; Sun, Z.; Slesarev, A.; Alemany, L. B.; Lu, W.; Tour, J. M. *ACS Nano* 2010, 4, 4806-4814). Perhaps most apparent are the broad O—H stretching peaks centered at 3420 cm$^{-1}$ in the unreduced samples. Other major peaks observed in the GO material include a C—H stretch at 2900 cm$^{-1}$, C═O vibration at 1730 cm$^{-1}$, C═C stretch at 1620 cm$^{-1}$, C—O ether stretch at 1230 cm$^{-1}$, and epoxy asymmetric and symmetric stretches at 865 cm$^{-1}$ and 1030 cm$^{-1}$, respectively. The alkylation reaction is confirmed by the shifts of the carbonyl peaks and appearance of new ones in the range of 1230-1500 cm$^{-1}$. The peaks shift to higher wavenumbers as a result of the decrease in conjugation, presumably due to the aliphatic dodecyl chains. These shifts are also accompanied by the formation of a wide doublet peak in the alkane stretch signal at 2800 cm$^{-1}$ that is much more pronounced than unmodified GO.

Upon reduction of GO and A-GO with hydrazine, most of the chemical functionality is removed, as indicated by the relatively flat profile shown in red and magenta. After reduction of the A-GO to A-rGO, shown in pink, there remains a small peak at 2800 cm$^{-1}$ corresponding to the C—H stretch of the alkyl chains. This feature, combined with the presence of the C—O stretch at 1230 cm$^{-1}$, which is consistent with C—O ether stretching, confirms that the final A-GO was successfully reduced with the alkyl chains intact via ether linkages. As expected, the decrease of the carbonyl signal at 1730 cm$^{-1}$ suggests that most of the ester-functionalized dodecyl chains did not survive the reduction process. This is also supported by the significant loss of alkane signal at 2800 cm$^{-1}$ in comparison to A-GO. The rGO and A-rGO samples each feature a medium peak at approximately 2100 cm$^{-1}$ that is not readily identifiable nor shared by the spectra of the unreduced analogues.

Example 6: Solid-State $^{13}$C Nuclear Magnetic Resonance ($^{13}$C NMR) Structural Characterization Solid-state $^{13}$C NMR measurements of the graphene oxide before and after functionalization are shown in FIG. 12. Many of the features of unfunctionalized GO are consistent with previously reported measurements in the literature (Park, S.; Hu, Y.; Hwang, J. O.; Lee, E. S.; Casabianca, L. B.; Cai, W.; Potts, J. R.; Ha, H. W.; Chen, S.; Oh, J.; Kim, S. O.; Kim, Y. H.; Ishii, Y.; Ruoff, R. S. *Nat. Commun.* 2012, 3, 638; Cai, W.; Piner, R. D.; Stadermann, F. J.; Park, S.; Shaibat, M. A.; Ishii, Y.; Yang, D.; Velamakanni, A.; An, S. J.; Stoller, M.; An, J.; Chen, D.; Ruoff, R. S. *Science* 2008, 321, 1815-1817). Peaks at 140 ppm and 60 ppm correspond to sp$^2$ carbon-carbon bonds of the planar C network. In the A-GO sample, there is an emergence of a strong peak at 30 ppm corresponding to the alkyl chains that were added during the functionalization reaction. Furthermore, there are peaks corresponding to ester and ether functionalities in the A-GO spectra located at 180 ppm. It bears mentioning that alkyl chains grafted via ester linkages will cleave upon hydrazine reduction and therefore be absent in the final A-rGO product. Spectra of rGO and A-rGO were not possible due to the electrical conductivity resulting from reduction.

Example 7: Electrical Conductivity Characterization

Electrical conductivity measurements were performed as an assessment of the applicability for this type of modification strategy for electronic and spacesuit applications, where conductivity offers protection against electrostatic charges. Pellets of rGO and A-rGO were pressed using an IR pellet press and their resistivity was measured using the van der Pauw method (van der PAUW, L. J. *Phillips Res. Rep.* 1958, 72, 1-9), before and after thermal annealing overnight at 120° C. under vacuum. The results of these measurements are summarized in Table 6.

TABLE 6

Surface resistivity and electronic conductivity of rGO and A-rGO pellets before and after annealing under vacuum at 120° C. overnight.

| | Material | t [mm] | ρ [Ω-m] | Σ [S m$^{-1}$] |
|---|---|---|---|---|
| As Pressed | rGO | 0.15 | 1.3 | 1.2 |
| | A-rGO | 0.14 | $2.5 \times 10^5$ | $6.6 \times 10^{-6}$ |
| Annealed | rGO | 0.15 | $8.0 \times 10^{-1}$ | 1.8 |
| | A-rGO | 0.14 | $8.0 \times 10^4$ | $2.3 \times 10^{-5}$ |

In the as-pressed samples, electrical conductivities of 1.2 S/m and $6.6 \times 10^{-6}$ S/m were recorded for rGO and A-rGO, respectively. The significant reduction in conductivity of the A-rGO material is explained by two factors. First, the attachment of dodecyl chains on the basal plane of the GO disc hinders restoration of the sp$^2$ network upon hydrazine reduction. The presence of these groups is supported by the increased functionality of the A-rGO observed from FTIR, elemental analysis, and solid-state NMR results discussed previously. Another anticipated effect of the dodecyl chains is that they will prevent interplanar stacking between A-rGO nanoparticles, thereby decreasing the interparticle charge transfer. While this is a drawback regarding electrical conductivity, this effect likely plays a significant role in the enhanced miscibility of the A-rGO in an HDPE matrix.

Another source of insulation could arise from the presence of water or solvent entrapped in the A-rGO materials. To explore this possibility, electrical conductivities were also measured after thermal annealing at 120° C. overnight under vacuum to remove any entrapped water. After thermal annealing, only a marginal enhancement of the conductivity was observed for the rGO sample. Although annealing led to a 10× increase in the conductivity of the A-rGO sample, the resulting conductivity remains low compared to the unmodified rGO counterpart. Therefore, this lack of conductivity is attributed to the abundant functionalization of the A-rGO basal plane.

Example 8: Dynamic Mechanical Analysis

Figure 13A:
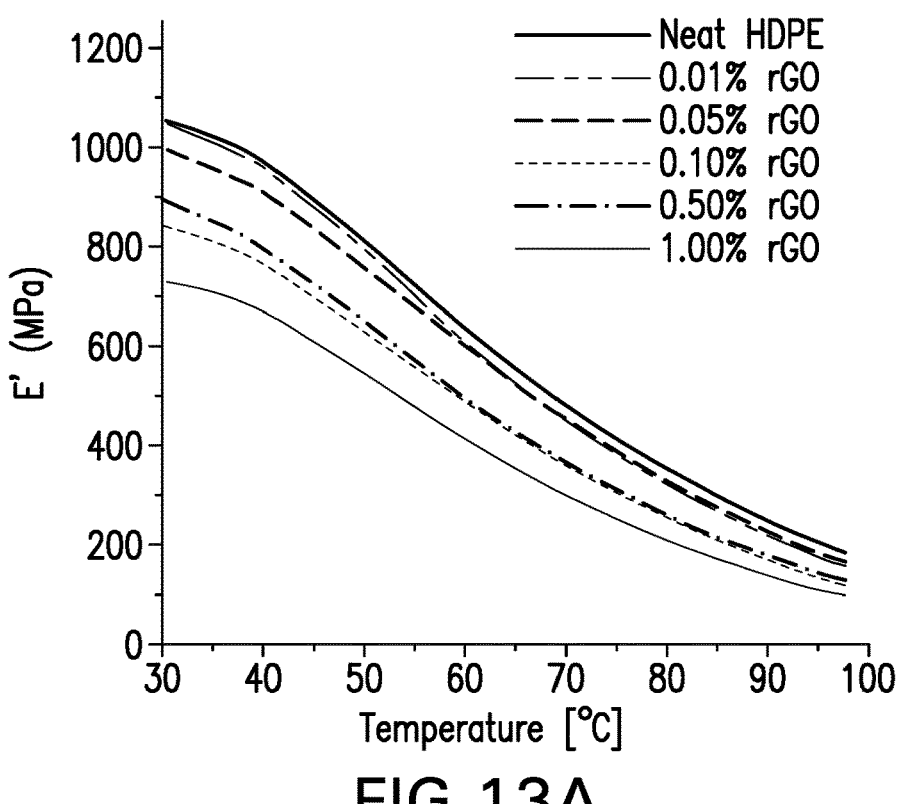
FIG. 13 shows dynamic mechanical analysis (DMA) thermal sweeps of composites containing rGO (a) and A-rGO (b). The temperatures were chosen based on temperatures experience on the lunar surface.
Figure 13B:
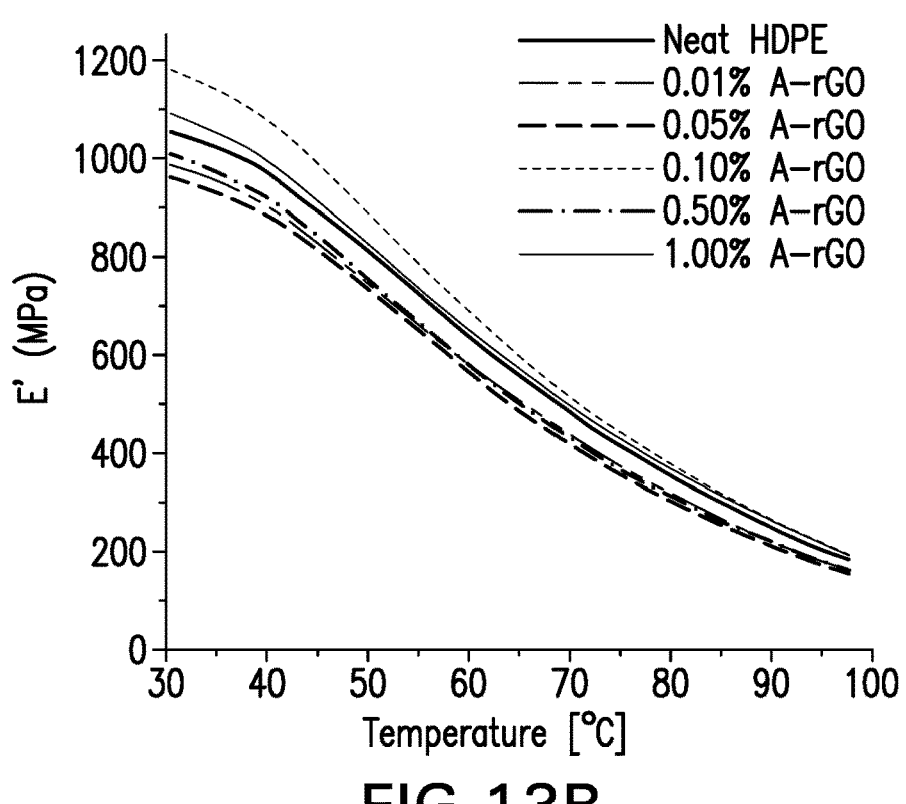

Dynamic mechanical analysis measurements as a function of temperature were used to examine the impact on composite mechanical properties and obtain a more quantitative assessment of the dispersion of rGO and A-rGO nanoparticles throughout the HDPE matrix. A temperature range of 30° C. to 100° C. was chosen to capture the performance of these materials at the upper bound of temperatures experienced on the lunar surface given their potential in spacesuit applications and activities around the Moon (NASA Lunar Gateway). The storage modulus and tan(δ) of these measurements are shown in FIG. 13.

In the rGO sample set, none of the samples exhibited higher storage moduli than the neat HDPE sample, and in general the storage moduli decreased with rGO loading level. Alternatively, the samples containing the A-rGO additive exhibited a slight enhancement in storage moduli for loading levels of 0.1 and 1.0% compared to the control HDPE sample. In the best performing sample, 0.1% loading of A-rGO, there is a 30% improvement in the measured storage modulus compared to the 0.1% rGO counterpart. This result, in conjunction with the overall enhancement of modulus at all loading levels, indicates that the dodecyl chains are improving the miscibility of the additives within the matrix. Furthermore, the storage moduli for all samples remains sufficient at even the hottest temperatures on the lunar surface that these composites could be used in low stress applications on the lunar surface.

Example 9: Static Mechanical Properties

Figure 14:
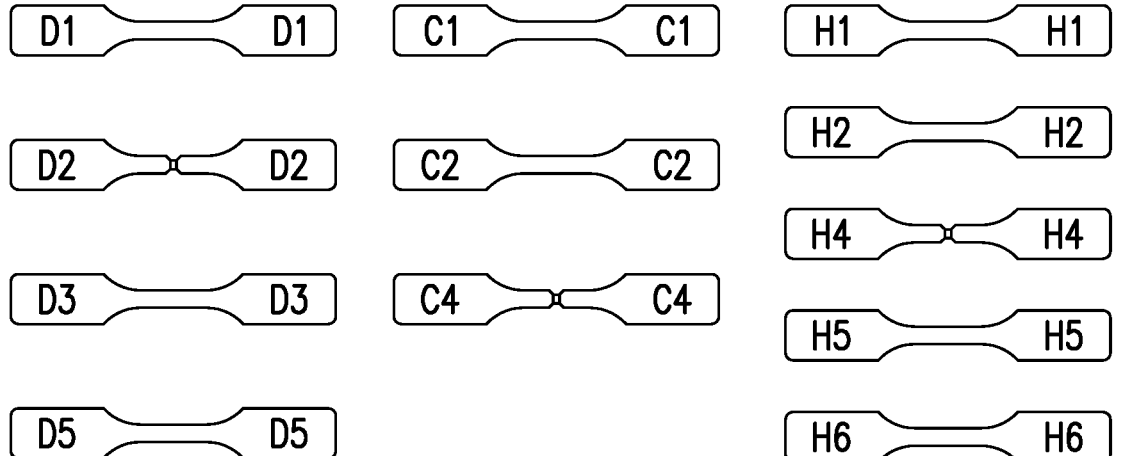
FIG. 14 shows samples after static mechanical testing up to 4.5 mm cross-head displacement. (Top left): neat HDPE samples; (top right): 0.1% A-rGO samples; (left) 0.1% rGO samples. All samples are ~3 mm wide in their gauge section.
Figures 15A, 15B, 15C:
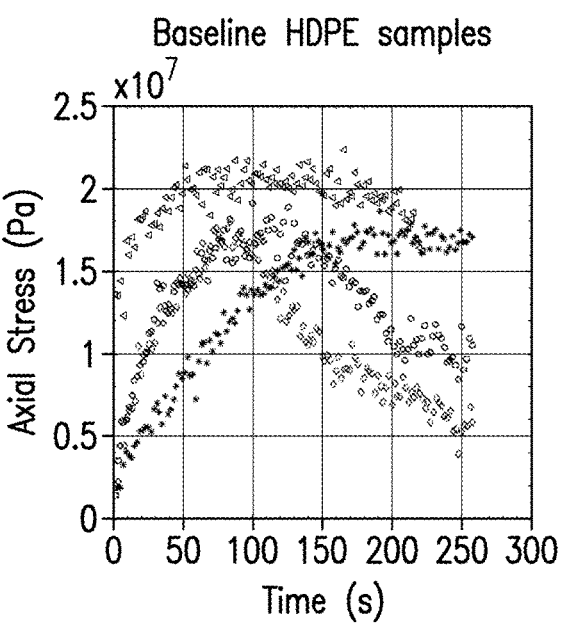
FIG. 15 shows axial stress versus time curves of neat HDPE, 0.1% rGO, and 0.1% A-rGO samples tested up to 4.5 mm cross-head displacement. The colors correspond to different tested samples.

The samples' static mechanical performance varied within the selected actuator displacement range, even for the same group of samples and for the neat HDPE samples. Response varied from stretching with no apparent necking areas, to stretching with a clear necking area, to stretching and fracture for few samples, without a clear correlation with loading and functionalization type. The images of these various failure modes as shown in FIG. 14, along with stress versus time plots in FIG. 15 for the 0.1% A-rGO, 0.1% rGO and neat HDPE samples. The variety of deformation modes in the same samples is paralleled by scatter of material properties as illustrated in FIG. 16. Among the samples, the 0.1% A-rGO treatment may be the most promising for the yield strength, with lower scatter (notwithstanding only 3 samples being tested) and a median that is ~14% higher than the baseline median. This is consistent with the DMA plots shown in the previous section. The scatter of deformation modes in the same samples is paralleled by the scatter of material properties, as shown in the form of boxplots for the 0.1% A-rGO, 0.1% rGO and baseline configurations (FIG. 16, Images a-c). The scatters of the stiffness and Poisson's ratio values are considerably higher, making assessment of treatments more difficult. The median yield strength of the tested baseline samples, 20.02 MPa, is compatible with the published data of different types of processed HDPE, which range from 2.69-200 MPa for extruded HDPE to 15.2-42.1 MPa for blow molding grade HDPE. The median Young's modulus of the tested baseline samples, 1.49 GPa, is consistent with published data: 0.620-1.45 GPa for extruded HDPE, 0.650-2.07 GPa for blow molding grade HDPE.

Within the selected displacement range and strain rate, the same for all samples, the variation of trends (clearly defined by a maximum, or lack thereof) parallels the variation of necking features in the samples. A possible explanation for the improved tensile strength of 0.1% A-rGO with respect to 0.1% rGO could be the presence of aggregates in the rGO samples, which are compared using SEM in FIG. 5d-e. Furthermore, the rGO composites were far less homogeneous, which was apparent by sample color and the appearance of aggregates upon visual inspection. It is envisioned that the aggregates cause stress concentrations and, due to their variability in the samples' volume, impact results scatter. Such aggregates are not as evident in the A-rGO samples, which macroscopically are also significantly more uniform in color than the rGO samples.

Example 10: Composite Fabrication Process

Figures 17A, 17B, 17C, 17D, 17E:
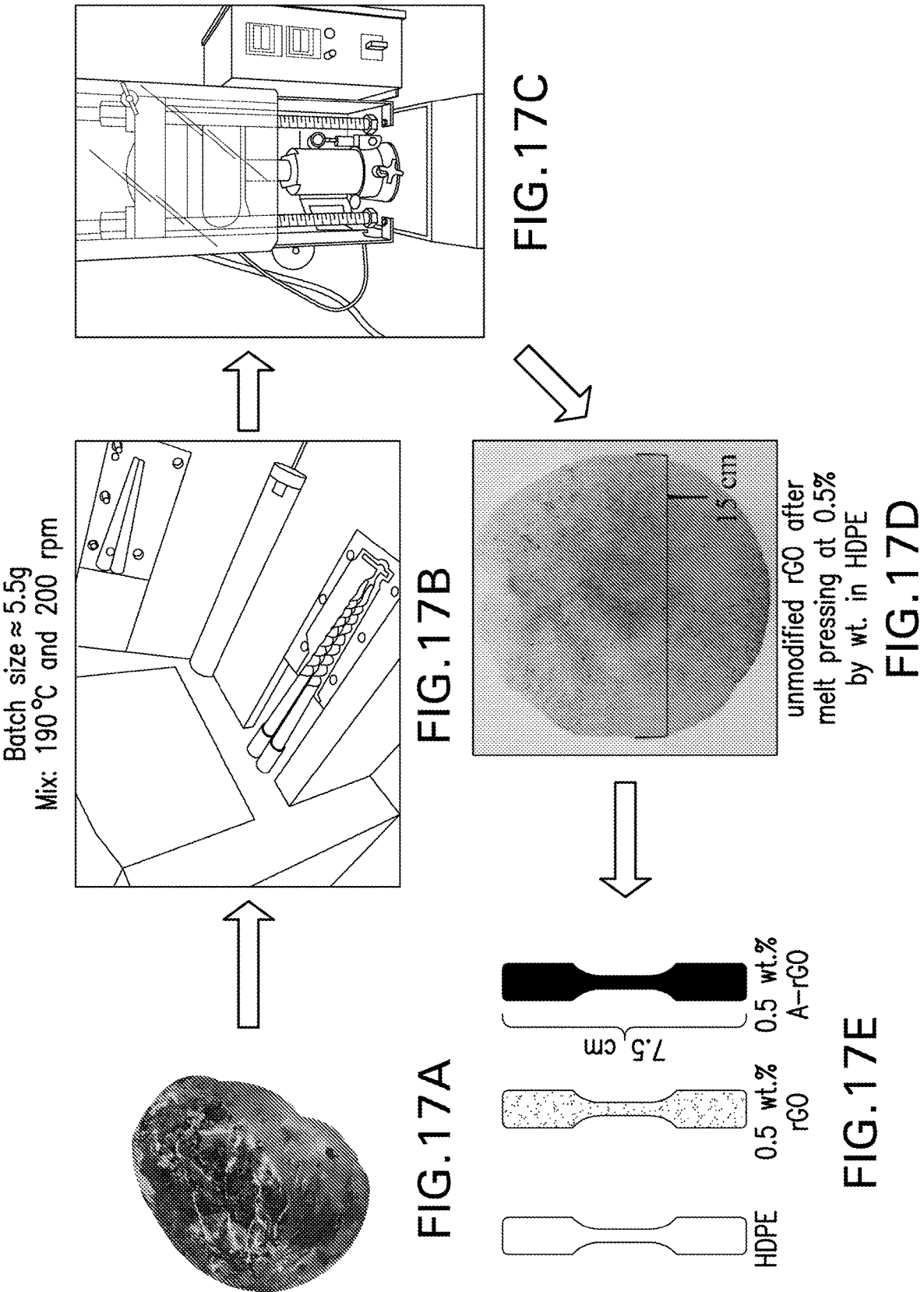
FIG. 17 illustrates an overview of composite fabrication process. A) Premixing, B) melt compounding use a recirculating extruder, C & D) melt pressing, and E) final composite form after cutting using ASTM D638 die. Melt processing was performed at 190° C. and the batch size was nominally 5.5 g, which was limited by the extruder capacity.

Composite samples were fabricated with rGO (resulting in control composites) and A-rGO at loading levels ranging from 0.1-1.0% by weight in HDPE (Sigma Aldrich, $M_n$ of 80,000 g/mol) using a multi-step process illustrated in FIG. 17. To prevent the powdered graphene additives from being ejected out of the extruder inlet during processing, a pre-mixing step was performed, in which a measured amount of HDPE was first melted in a beaker at 190° C., and allowed to completely melt as indicated by its color change from an opaque white solid to a clear amorphous solid. Next, a calculated amount of rGO or A-rGO was added to the molten polymer to achieve the target loading level. The molten composite (FIG. 17, Image A) was then folded over the graphene powder and pressed flat. This "puck" of molten HDPE and graphene was then allowed to cool to room temperature and cut into pieces small enough to fit into the extruder inlet.

To ensure complete mixing of the graphenes in the HDPE matrix, the Thermo Scientific HAAKE MiniLab extruder was used to recirculate approximately 5.5 g of composite material per batch. Each batch of material was recirculated for 2 h at 180° C. using a screw speed of 100 rpm. Typically, a torque of 100 N-cm was observed for these mixing parameters. After mixing, the material was removed from the extruder and placed into a Carver hot press (model 3851-0), where films were pressed at 3 tons and 180° C. for 5 min, while using a Teflon mold to obtain consistent thicknesses on the order of 1 mm. To have comparable thermal histories, neat HDPE samples were fabricated using this same process of compounding for 2 h followed by melt pressing into films. For samples used in DMA and tensile testing, each film was cut into "dog bone" samples using an ASTM D638 die, type V sample geometry.

Immediately upon melt processing, the enhanced miscibility of the A-rGO becomes apparent as can be seen from in FIG. 17, Image E, in which a neat HDPE sample is shown alongside 0.5% loading of rGO, and A-rGO, respectively. In this comparison, the speckled appearance of the 0.5% rGO sample contains much more aggregation than the analogous sample with 0.5% A-rGO, that is much darker and more uniformly colored throughout. This type of aggregation was observed in rGO samples at all loading levels, while the A-rGO-containing samples only exhibited minimal signs of aggregates when observed with the naked eye, even at the highest loading level of 1.0%.

Example 11: Samples Preparation for Mechanical Testing and DMA

Figure 18:
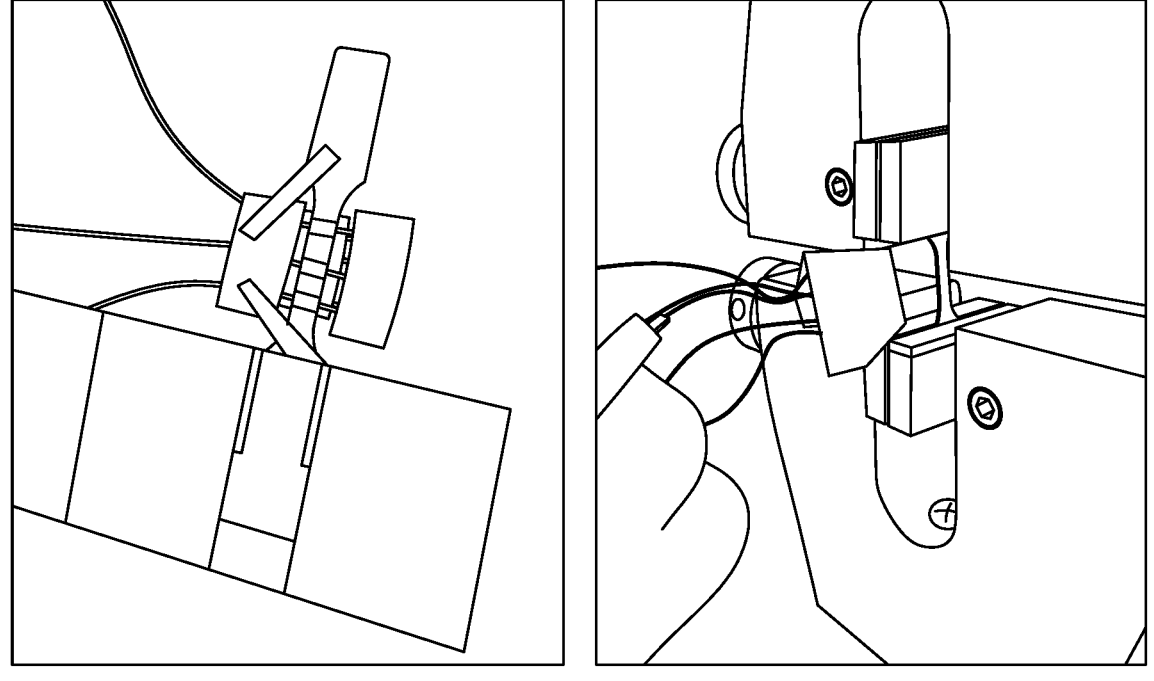
FIG. 18 shows neat HDPE sample being prepared for tensile testing. The cardboard (left) was removed after the sample was aligned in the grips before testing.

Neat HDPE, baseline rGO, and A-rGO composites at different loading levels, were tested following ASTM D638 protocols under quasi-static conditions to obtain mechanical properties (yield strength, Young's modulus and Poisson's ratio) in ambient atmosphere. The size of the samples (0.3-0.45 mm thickness range, ~3.1 mm width) required particular care in the selection and application of strain gauges. Strain gauges with a 350Ω grid (biaxial rosette, Omega SGT-3BH/350-XY41) were applied following standard surface cleaning and gauge application procedures. However, standard soldering could not be used because of the risk of melting the samples. Wires (30 AWG) were bonded to the gauges' solder pads with conductive epoxy (MG Chemicals 8331-14G), with masking tape applied to provide stress relief to the wires as shown in FIG. 18. Samples were carefully positioned in a screw-driven axial machine (a 22 kN SATEC, controlled by Instron Blue Hill software), and tested at a strain rate of 0.1 mm/mm/min. The strain acquisition was obtained through Vishay System 7000/StrainSmart hardware/software. The test was stopped when the actuator displacement reached a set value (4.5 mm), which was past the maximum load point for all samples.

Storage and loss moduli as a function of temperature were determine using dynamic mechanical analysis measurements that were recorded using a TA DMA Q800. Measurements were performed in tension using a constant strain of 0.05%, a preload force of 0.001 N, and a frequency of 1.00 Hz while increasing the temperature from 30-100° C. at 3° C./min.

Samples appropriate for cross-sectional imaging were prepared by immersing dog bone samples into liquid nitrogen until they reached thermal equilibrium. Samples were then snapped and cut down to size appropriate for an SEM holder. Each cross section was adhered to a sample pedestal using carbon tape and then subsequently coated in gold using a sputter coater to prevent surface charging. Images were recorded using a Zeiss Ultra60 FE-SEM.

While in the foregoing specification this invention has been described in relation to certain embodiments thereof, and many details have been put forth for the purpose of illustration, it will be apparent to those skilled in the art that the invention includes additional embodiments and that certain of the details described herein can be varied considerably without departing from the basic principles of the invention.

All references cited herein are incorporated by reference in their entirety. The present invention may be embodied in other specific forms without departing from the spirit or essential attributes thereof and, accordingly, reference should be made to the appended claims, rather than to the foregoing specification, as indicating the scope of the invention.

We claim:

1. A method of chemically functionalizing graphene oxide to form a reduced form of graphene oxide comprising:

performing a first sequence comprising:

reacting graphite flakes with potassium permanganate and sulfuric acid to form graphene oxide;

reducing the graphene oxide with a reducing agent to form a reduced graphene oxide; and then reacting the reduced graphene oxide with sodium hydride and dodecyl bromide to form an alkylated reduced graphene oxide; or performing a second sequence comprising:

reacting graphite flakes with potassium permanganate and sulfuric acid to form graphene oxide;

reacting the graphene oxide with sodium hydride and dodecyl bromide to form an alkylated graphene oxide; and then reducing the alkylated graphene oxide with a reducing agent to form the alkylated reduced graphene oxide.

2. The method of claim 1, wherein each of the first and second sequences further comprise:

forming a polymeric nanoparticle composite comprising a dispersion of polymer matrix and the alkylated reduced graphene oxide.

3. The method of claim 2, wherein the polymer matrix comprises a thermoplastic polymer; and wherein the thermoplastic polymer is selected from the group consisting of polyesters, polyethylene, polypropylene, polyvinyl chloride, silicones, acrylic polymers, fluoropolymers, polyurethanes, polystyrene, polyimide, and combinations thereof.

4. The method of claim 3, wherein the polyethylene is selected from the group consisting of low density polyethylene (LDPE), linear low density polyethylene (LLDPE), high density polyethylene (HDPE), medium density polyethylene (MDPE), ultra-high molecular weight polyethylene (UHMWPE), cross-linked polyethylene (XLPE), and combinations thereof.

5. The method of claim 4, wherein the polyethylene is high density polyethylene (HDPE).

6. The method of claim 2, wherein the polymer matrix comprises a thermosetting polymer; and wherein the thermosetting polymer is selected from the group consisting of epoxies, epoxy-polyester hybrids, phenolics, melamines, urethanes, and combinations thereof.

7. The method of claim 1, wherein the alkylated reduced graphene oxide comprises nanoparticles having an electrical conductivity of about $1\times10^{-7}$ S/m to about $1\times10^{4}$ S/m.

8. The method of claim 1, wherein the alkylated reduced graphene oxide comprises nanoparticles having a diameter of about 5 $\mu$m to about 40 $\mu$m.

9. The method of claim 1 further comprising:

adding the alkylated reduced graphene oxide to molten polymer to form a matrix;

pressing the matrix flat;

cooling the matrix;

cutting the matrix into pieces;

adding pieces of matrix into an extruder;

stirring and heating the matrix;

removing the matrix from the extruder;

placing the matrix into a Carver hot press; and pressing the matrix to form films of polymeric nanoparticle composite.

10. The method of claim 9, wherein the polymer is high density polyethylene (HDPE).

11. The method of claim 1, wherein each of the first and second sequences further comprise:

mixing the alkylated reduced graphene oxide and a solvent to form a dispersion; and depositing the dispersion onto a substrate.

12. The method of claim 11, wherein the substrate is selected from the group consisting of glass, ceramic, metal, polymer, organic material, and combinations thereof.

13. The method of claim 11, wherein the alkylated reduced graphene oxide comprises nanoparticles; and wherein the deposition of the dispersion nanoparticles onto the substrate is carried out by a method selected from the group consisting of drop-cast, spray-cast, spin coating, dip coating, flow coating, knife coating, curtain coating, slot coating, brushing, dipping, spreading, spraying, wiping, and combinations thereof.

14. The method of claim 11, wherein either:

the solvent is selected from the group consisting of water, an alcohol, a glycol, an ester, an ether, a ketone, an amide, a hydrocarbon, an aromatic solvent, a halogenated solvent, and combinations thereof; or the solvent is selected from the group consisting of toluene, chloroform, N-methyl-2-pyrrolidone (NMP), acetone, acetonitrile, N,N-dimethylformamide (DMF), water, and combinations thereof.

15. The method of claim 1, wherein the reducing agent is selected from the group consisting of hydrogen gas, a hydrazine, hydrazine hydrate, sodium borohydride, hydroquinone, and a combination thereof.

16. The method of claim 1, wherein the alkylated reduced graphene oxide comprises nanoparticles having an electrical conductivity of greater than about 100 S/m.

17. The method of claim 1, wherein the alkylated reduced graphene oxide comprises nanoparticles having:

a resistivity $\rho$ ($\Omega$-cm) of from about $1.3\times10^{-3}$ to about $3.0\times10^{-3}$; and an electronic conductivity $\sigma$ (S/cm) of from about $3.4\times10^{2}$ to about $7.5\times10^{2}$.

18. A radiation-shielding material comprising the polymeric nanoparticle composite formed by the method of claim 1.

19. A method of chemically functionalizing graphene oxide to form a reduced form of graphene oxide comprising:

performing a first sequence comprising:

reacting graphite flakes with potassium permanganate and sulfuric acid to form graphene oxide;

reducing the graphene oxide with a reducing agent to form a reduced graphene oxide; and then reacting the reduced graphene oxide with a base and an alkyl halide to form an alkylated reduced graphene oxide; or performing a second sequence comprising:

reacting graphite flakes with potassium permanganate and sulfuric acid to form graphene oxide;

reacting the graphene oxide with a base and an alkyl halide to form an alkylated graphene oxide; and then reducing the alkylated graphene oxide with a reducing agent to form the alkylated reduced graphene oxide;

wherein:

reacting with the base comprises reacting with the base in N-methyl-2-pyrrolidone (NMP);

the reducing agent comprises hydrazine hydrate;

the base is sodium hydride; and the alkyl halide is dodecyl bromide.

20. A method of chemically functionalizing graphene oxide to form a reduced form of graphene oxide comprising:

performing a first sequence comprising:

reducing graphene oxide with hydrazine hydrate as a reducing agent in N-methyl-2-pyrrolidone (NMP) solvent to form a reduced graphene oxide; and then reacting the reduced graphene oxide with sodium hydride as a base and dodecyl bromide as an alkyl halide to form alkylated reduced graphene oxide having an electronic conductivity $\sigma$ (S/cm) of from about $3.4 \times 10^2$ to about $7.5 \times 10^2$; or performing a second sequence comprising:

reacting graphene oxide with sodium hydride as a base and dodecyl bromide as an alkyl halide in N-methyl-2-pyrrolidone (NMP) solvent to form alkylated graphene oxide; and then reducing the alkylated graphene oxide with hydrazine hydrate as a reducing agent to form alkylated reduced graphene oxide having an electrical conductivity of from about $3.4 \times 10^2$ $\sigma$ to about $7.5 \times 10^2$ $\sigma$.

* * * * *